US008706296B2

(12) United States Patent
Krajewski et al.

(10) Patent No.: US 8,706,296 B2
(45) Date of Patent: Apr. 22, 2014

(54) MOBILE ROBOT INTERNAL COMMUNICATION SYSTEM

(75) Inventors: Wojciech Krajewski, Woburn, MA (US); Tyson Sawyer, Mason, NH (US)

(73) Assignee: iRobot Corporation, Bedford, MA (US)

( * ) Notice: Subject to any disclaimer, the term of this patent is extended or adjusted under 35 U.S.C. 154(b) by 394 days.

(21) Appl. No.: 13/028,950

(22) Filed: Feb. 16, 2011

(65) Prior Publication Data

US 2011/0231014 A1    Sep. 22, 2011

Related U.S. Application Data

(60) Provisional application No. 61/305,069, filed on Feb. 16, 2010.

(51) Int. Cl.
*G06F 19/00* (2011.01)
*G06F 15/16* (2006.01)
*G06F 3/00* (2006.01)

(52) U.S. Cl.
USPC ...... 700/245; 701/1; 701/2; 701/46; 709/201; 710/7; 710/22

(58) Field of Classification Search
USPC ............. 710/7, 22; 709/201; 901/1, 46, 2; 700/245
See application file for complete search history.

(56) References Cited

U.S. PATENT DOCUMENTS

| | | | |
|---|---|---|---|
| 6,377,013 B2 * | 4/2002 | Suzuki | 318/568.1 |
| 6,427,174 B1 * | 7/2002 | Sitaraman et al. | 709/245 |
| 6,839,777 B1 * | 1/2005 | Vrancic et al. | 710/52 |
| 2002/0138647 A1 * | 9/2002 | Haugen | 709/242 |
| 2004/0107320 A1 * | 6/2004 | Gallo et al. | 711/147 |
| 2007/0058929 A1 * | 3/2007 | Chaffee | 386/78 |
| 2007/0210916 A1 * | 9/2007 | Ogushi et al. | 340/531 |
| 2009/0234471 A1 * | 9/2009 | Chandhoke | 700/86 |
| 2010/0050025 A1 * | 2/2010 | Grichnik et al. | 714/47 |
| 2010/0064026 A1 * | 3/2010 | Brown et al. | 709/217 |
| 2010/0142421 A1 * | 6/2010 | Schlicht et al. | 370/310 |
| 2011/0071679 A1 * | 3/2011 | Barajas et al. | 700/259 |

FOREIGN PATENT DOCUMENTS

WO    WO2004/028753    4/2004

OTHER PUBLICATIONS

Tanase et al: "Autonomous Mobile Device Controlled by On-chip Network of intelligent sensors for indoor environment navigation", Electronics and Electrical Engineering, No. 5(93), Jan. 1, 2009, pp. 77-82, XP009147688.
Wenn D et al: "Distributed Control at Multi-axis Robot Systems using Local Operating Networks", Control, 1994. Mar. 21-24, 1994 vol. 2. International Conference on Coventry, London, UK,IEE, UK, pp. 1000-1005, XP006512948.
International Search Report/Written Opinion dated May 19, 2011from corresponding application PCT/US2011/025105.

* cited by examiner

*Primary Examiner* — Farley Abad
(74) *Attorney, Agent, or Firm* — Fish & Richardson P.C.

(57) ABSTRACT

A peripheral device communication system includes a communications medium having physical network hardware. The system also includes a first network device capable of issuing to the physical network hardware a request to communicate a datagram with greater priority than any other communications request. This datagram encapsulates a memory register access command. The system further includes a second network device having addressable memory registers and capable of issuing to the physical network hardware a request to communicate a datagram with greater priority than any other communications request. This datagram encapsulates a response to a memory register access command.

13 Claims, 27 Drawing Sheets

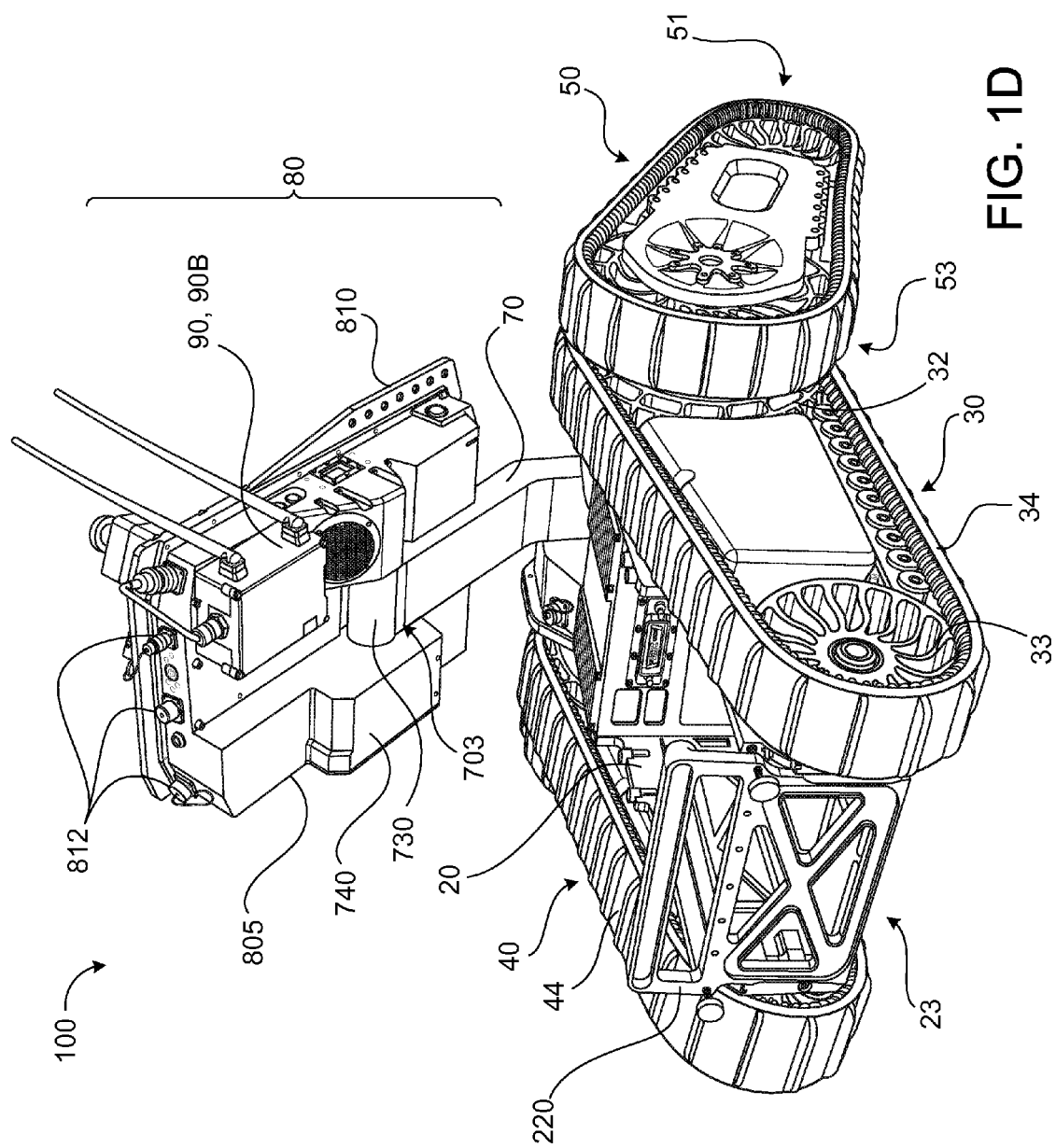

MOBILE ROBOT INTERNAL COMMUNICATION SYSTEM

CROSS REFERENCE TO RELATED APPLICATIONS

This U.S. patent application claims priority under 35 U.S.C. §119(e) to U.S. Provisional Application 61/305,069, filed on Feb. 16, 2010. The disclosure of the prior application is considered part of and are hereby incorporated by reference in the disclosure of this application.

TECHNICAL FIELD

This disclosure relates to internal communication systems for mobile robots, as for communicating with one or more peripheral devices over an internal network.

BACKGROUND

Modern robots incorporate a variety of electronic components, all of which may need to communicate with one another. Such components require a robust and adaptable communications network for ideal operation. Electronic communications networks exist in a variety of configurations. Many operate according to widely-adopted standards for their respective communications protocols, physical interfaces, and interconnecting hardware devices. Network components operating according to these standard protocols are widely available.

SUMMARY

A robot that uses standard communications protocols can use some standard "off-the-shelf" equipment, rather than all custom components that may be more costly. However, standard equipment isn't necessarily designed to be used in the robot's native environment. A robot, especially one that operates in harsh conditions, needs reliable internal communications. Further, a standard protocol, like Ethernet, doesn't have a built-in mechanism for interfacing with custom components. Some approaches isolate some of the standard equipment from the custom components, but this reduces the interoperability between the two types. Other approaches add hardware to the standard equipment to adapt them to working with custom components and the robotic environment, but this is also costly, and not all standard equipment can be adapted in this way.

The system of communication described below allows a robot to have standard communications protocols as well as custom components using a single network connecting all of the robot components. The network handles all of the traffic between components without isolating any network segments from each other. This approach also assigns priority to network traffic and allows for redundancy with a minimum of processing overhead so that mission-critical robot commands are reliably transmitted.

One aspect of the disclosure provides a mobile robot internal communication system that includes an I/O node network comprising a plurality of I/O resource nodes having addresses confined to actuators and sensors within the network. Each I/O resource node has direct memory access, a local controller, I/O terminals, and a network controller switch. The local controller has a communication protocol that carries I/O data and direct memory access I/O data.

Another aspect of the disclosure provides a mobile robot internal communication system that includes an I/O node network comprising a plurality of I/O resource nodes having addresses confined to actuators and sensors within the network. Each I/O resource node having direct memory access, a controller, I/O terminals, and a network controller switch. The controller has a communication protocol that carries direct memory access I/O data and memory access commands.

A further aspect of the disclosure provides a mobile robot internal communication system that includes an I/O node network comprising a plurality of I/O resource nodes having addresses confined to actuators and sensors within the network. Each I/O resource node has direct memory access, a controller, I/O terminals, and a network controller switch. The controller has a communication protocol that carries I/O data and a header configured to hold a minimum of four bytes of data. Also, the I/O node network includes a virtual local area network.

Yet another aspect of the disclosure provides a mobile robot internal communication system that includes an I/O node network comprising a plurality of I/O resource nodes having addresses confined to robot resources within the network. Each I/O resource node has direct memory access, a controller, I/O terminals, and a network controller switch. The robot resources include actuators and sensors. The controller has a communication protocol that packages function blocks under one addressing header of a single I/O node. Each function block carries data for one of the robot resources.

Implementations of these aspects of the disclosure might have other features. For example, in some implementations, each I/O node is a transceiver for a tunneled protocol. Each I/O node may be connectionless, free of error correction, and can process a data block having a header configured to hold a minimum of four bytes of data. In some examples, each I/O node can accept multiple duplicate memory operations sent over the I/O node network and, in response, can execute a single action. The communications protocol may have an assignable priority for network traffic.

Another aspect of the disclosure provides a mobile robot internal communication system that has a controller disposed on a mobile robot with one or more electronically controllable components in communication with the controller. Each robot component has a memory directly accessible by the controller and corresponding to at least one robot function. The controller issues memory access commands to the robot components. Each memory access command is contained in a datagram that has a single robot component address and a robot component operation corresponding to a state of the corresponding memory of the robot component. The memory access command writes robot component operation state information to the robot component memory.

Implementations of this aspect of the disclosure might have other features. In some implementations, the memory access command reads robot component operation state information from the robot component memory. The memory may represent at least one of a configuration of a portion of the robot component and data associated with a portion of the robot component. In some examples, the controller operates according to a media access control protocol supporting virtual local area network tagging. The controller might issue memory access commands asynchronously with respect to other communication requests. In some implementations, the datagram contains a second memory access command. In some examples, the controller generates a map of robot components in communication with the controller.

A further aspect of the disclosure provides a method of communicating with components of a mobile robot. The method includes, at a controller disposed on a mobile robot having one or more electronically controllable components in communication with the controller, issuing a memory access command to the robot components each having a memory directly accessible by the controller and corresponding to at least one robot function. The memory access command is contained in a datagram having a single robot component address and a robot component operation corresponding to a state of the corresponding memory of the robot component. The method also includes writing, based on the memory access command, robot component operation state information to the robot component memory.

Implementations of this aspect of the disclosure might have other features. The method may also include reading, based on the memory access command, robot component operation state information from the robot component memory. In some examples, the memory represents at least one of a configuration of a portion of the robot component and data associated with a portion of the robot component. The controller might operate according to a media access control protocol supporting virtual local area network tagging. The controller might issue memory access commands asynchronously with respect to other communication requests. In some implementations, the datagram contains a second memory access command. In some implementations, the controller generates a map of robot components in communication with the controller.

Yet another aspect of the disclosure provides a method of communicating with components of a mobile robot. The method includes, at a controller disposed on a mobile robot having one or more electronically controllable components in communication with the controller, issuing memory access commands to one of the robot components having a memory directly accessible by the controller and corresponding to at least one robot function. Each memory access command is contained in a datagram that has a single robot component address and a robot component operation corresponding to a state of the corresponding memory of the robot component. At least two memory access commands are contained in identical datagrams. The method also includes writing, based on the memory access commands, robot component operation state information to the robot component memory.

Another aspect of the disclosure provides a mobile robot including a drive system supported by a chassis for maneuvering the robot over a surface, I/O resource nodes in communication with robot resources, with at least one I/O resource node in communication with the drive system, a managed Ethernet switch in communication with each I/O resource node for managing communication of Ethernet packets according to an Ethernet protocol, and a robot controller in communication with each managed Ethernet switch. Each I/O resource node has a clock for time stamping data received by connected robot resources. The I/O resource node provides a datagram having a header of between about 4 bytes and about 8 bytes and a data for delivery in an Ethernet packet.

In some implementations, the robot controller queries data from I/O resource nodes and at least one I/O resource node streams data to the robot controller. The at least one streaming data I/O resource node may include a direct memory access controller for streaming data to the robot controller. In some examples, the Ethernet packet includes a quality of service requirement. The I/O resource node can aggregate data received from connected robot resources for delivery in a datagram. The aggregated data has at least one of the same level of quality of service and a lower level of quality of service with respect to a quality of service requirement for the Ethernet packet carrying the datagram. The I/O resource node may aggregate data having the same bit rate requirement. In some examples, the robot resource comprises at least one of a sensor and an actuator.

Another aspect of the disclosure provides a method of generating a map of a mobile robot internal communications network having a robot controller, a communications network in communication with the robot controller, and I/O resource nodes connected to the network. The method includes sending a broadcast echo-request to all I/O resource nodes on the network, receiving an echo response from every I/O resource node, wherein network switches of the network memorize a MAC Address of each associated I/O resource node, and generating an I/O resource node list. For each I/O resource nodes in the I/O resource node list, the method includes reading any available MAC table of the I/O resource node and storing the read MAC table. The method also includes receiving the stored MAC tables in a state algorithm executable on the robot controller. The state algorithm includes recursively querying for any connected I/O resource nodes on each port of each network switch to find all end nodes of the network.

In some implementations, the state algorithm includes, for each port of each network switch, querying for any connected I/O resource nodes. For each port having at least one I/O resource node, the method includes querying for I/O resource nodes with MAC tables. For each port having at least one I/O resource node with a MAC table, the method includes selecting the longest MAC table and marking the I/O resource node having the longest MAC table as a fork in the network. The method also includes recursively querying for any connected I/O resource nodes on each port of each network switch until an end-node is found on every port of every network switch of the network. In some examples, for each port free of any I/O resource nodes, the state algorithm comprises marking the port as an end of the network. For each port having an I/O resource node free of a MAC table, the state algorithm may include marking the I/O resource node as an end-node on that port.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 1D is a rear perspective view of a robotic vehicle.

Like reference symbols in the various drawings indicate like elements.

DETAILED DESCRIPTION

Figure 1A:
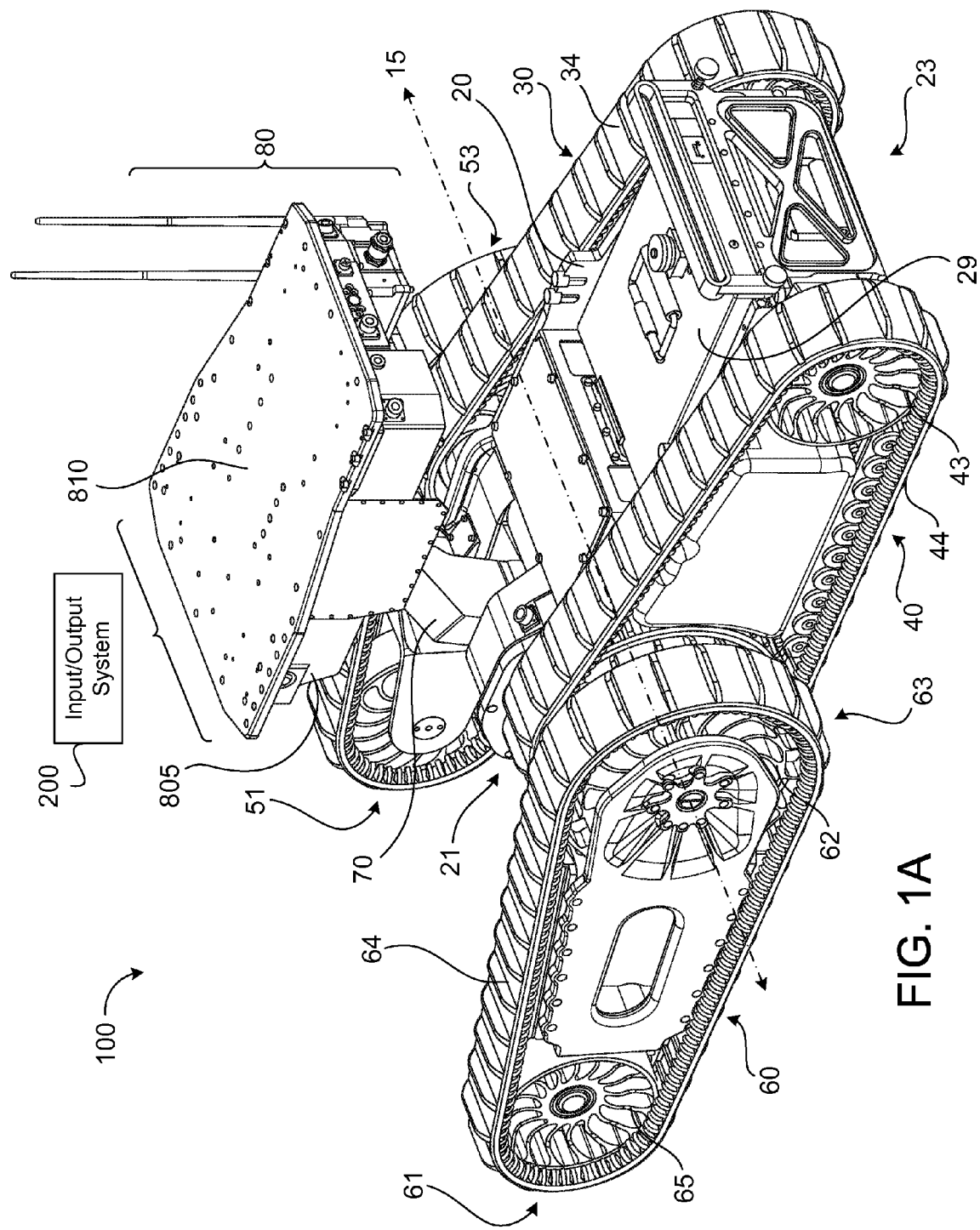
FIG. 1A is a perspective view of a robotic vehicle.
Figure 1B:
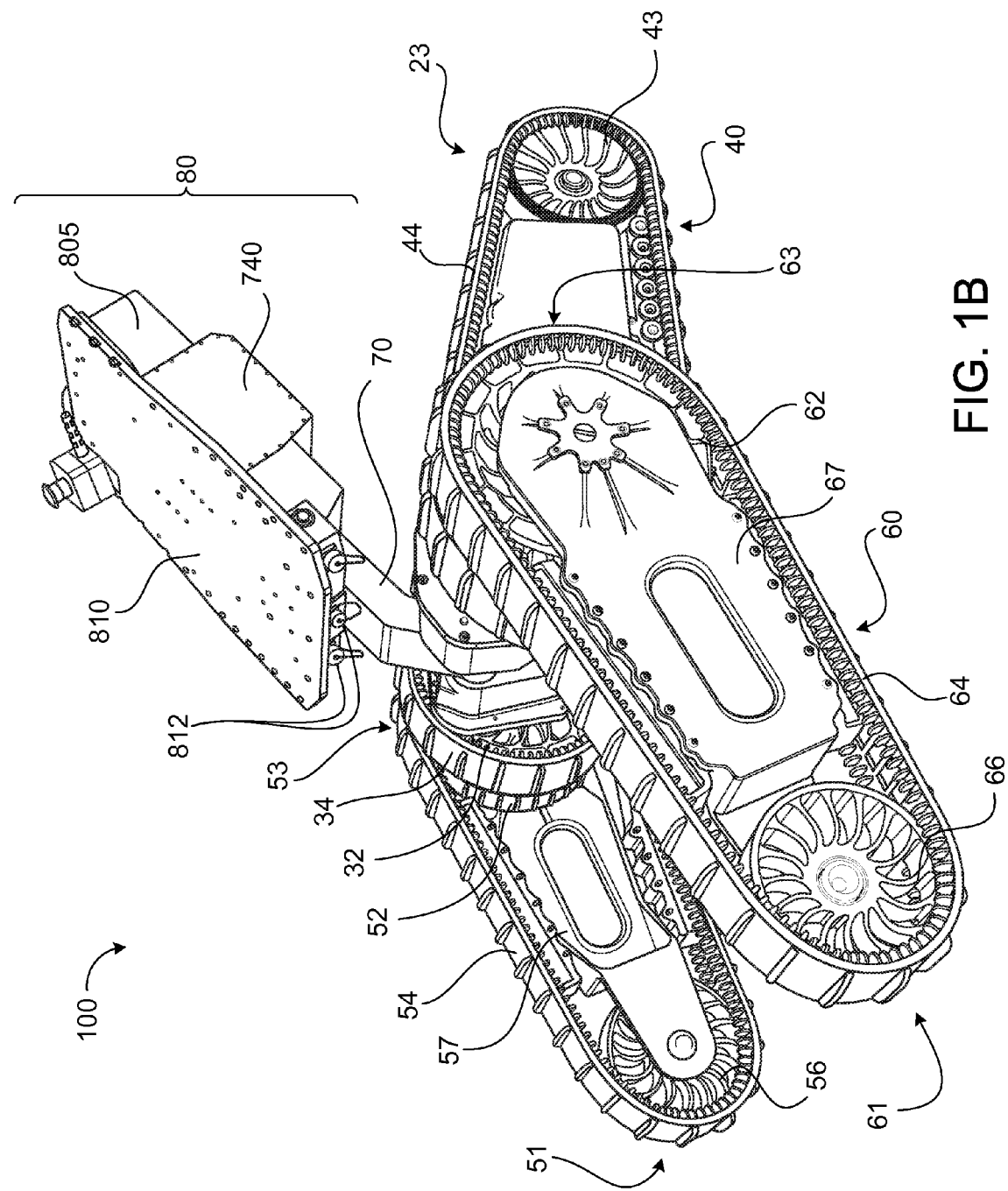
FIG. 1B is a front perspective view of the robotic vehicle shown in FIG. 1A.
Figure 1C:
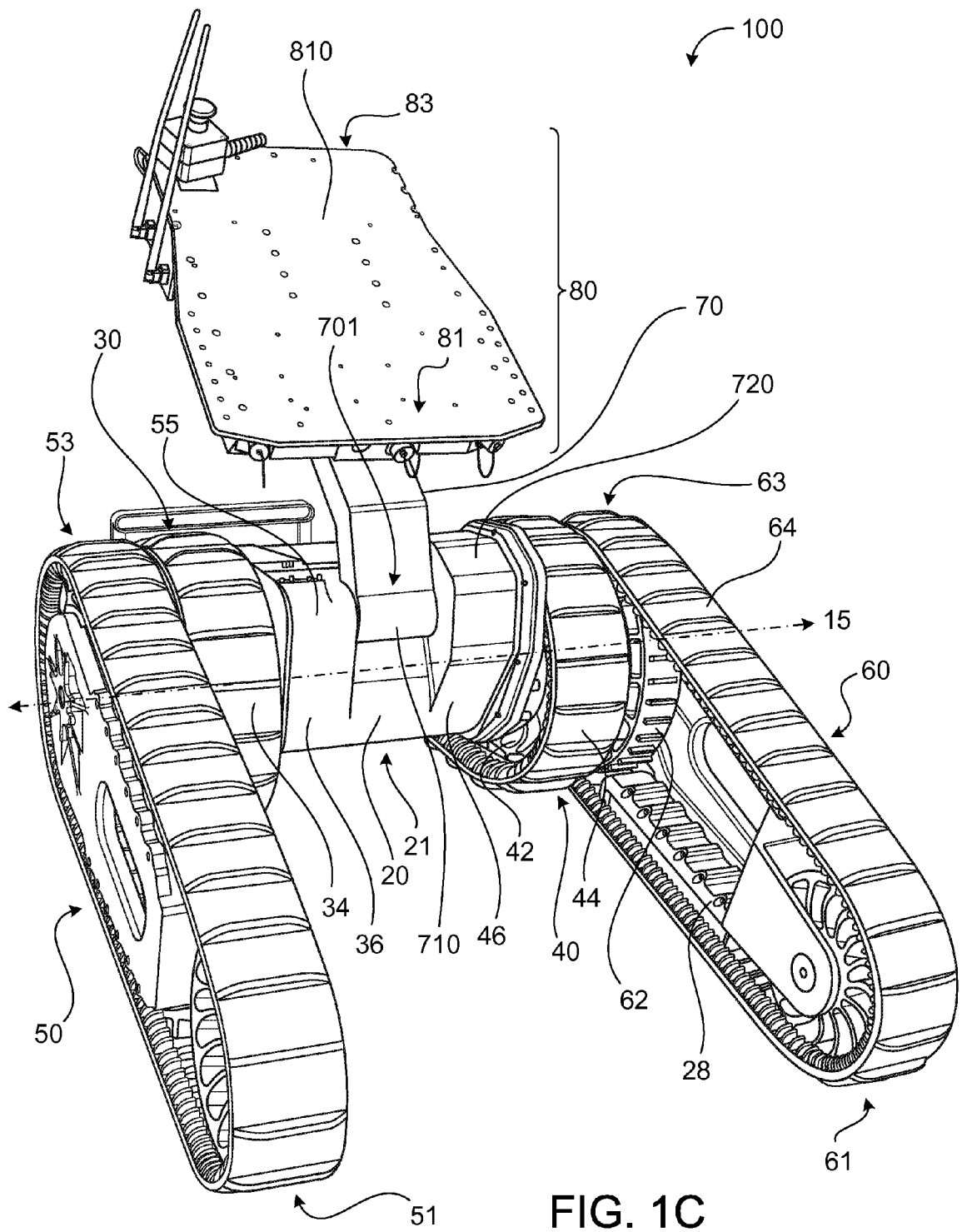
FIG. 1C is a rear perspective view of the robotic vehicle shown in FIG. 11.
Figure 1E:
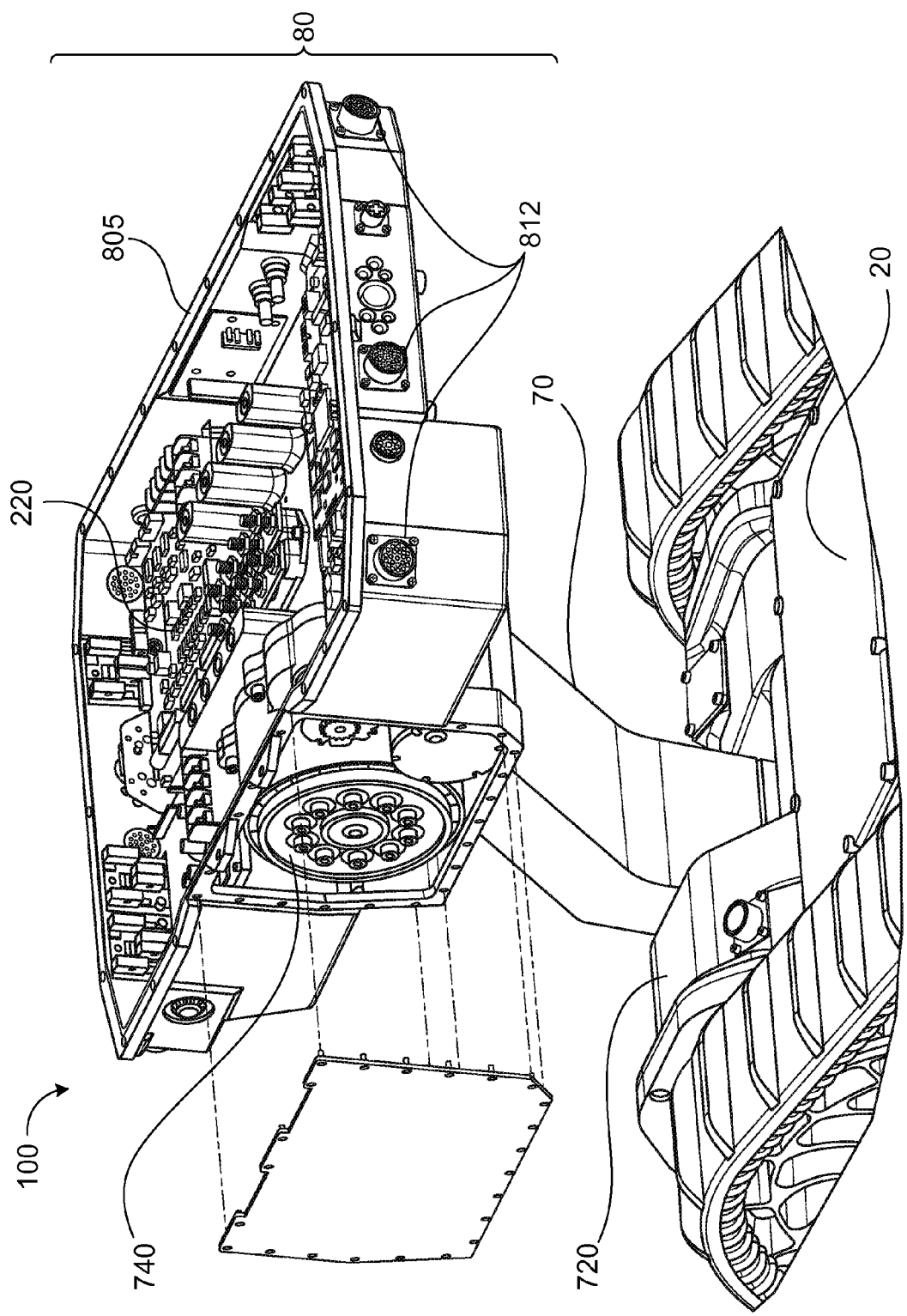
FIG. 1E is a perspective view of linkage connecting a deck assembly to a chassis of a robotic vehicle.

Referring to FIGS. 1A-1F, in some implementations, a robotic vehicle 100 (also referred to as a robot or mobile robot) is remotely operated to perform manpower intensive or high-risk functions (i.e., explosive ordnance disposal; urban intelligence, surveillance, and reconnaissance (ISR) missions; minefield and obstacle reduction; chemical/toxic industrial chemicals (TIC)/toxic industrial materials (TIM); etc.) without exposing an operator directly to a hazard. The robotic vehicle 100 includes a chassis 20 having front and rear ends 21, 23 and is supported on right and left drive track assemblies 30, 40 having corresponding driven tracks 34, 44. Each driven track 34, 44 is trained about a corresponding front wheel 32, 42, which rotates about a front wheel axis 15, and rear wheels 33, 43. Right and left flippers 50, 60 (also referred to as front arms) are disposed on corresponding sides of the chassis 20 and are operable to pivot about the front wheel axis 15 of the chassis 20. Each flipper 50, 60 has a corresponding driven track 54, 64 about its perimeter that is trained about a respective rear wheel 52, 62, which rotates about the front wheel axis 15 and distal wheels 56, 66. In the example shown, each flipper 50, 60 has a distal end 51, 61 and a pivot end 53, 63, with the rear wheel 52, 62 disposed on respective side arms 57, 67 at the pivot end 53, 63 of the flipper 50, 60 and the distal wheel 56, 66 disposed at the distal end 51, 61 of the flipper 50, 60. The flippers 50, 60 may be disposed on a side of the drive track assemblies 30, 40 that is opposite of the chassis 20 (e.g., out-board). The flippers 50, 60 can rotate fully through 360° about the front wheel axis 15.

The robotic vehicle 100 includes right and left motor drivers 36, 46 driving corresponding drive tracks 34, 44 and flipper tracks 54, 64, which are supported between their front and rear ends by bogie wheels or track supports 28. In some examples, the right and left motor drivers 36, 46 are operatively coupled to the respective front wheels 32, 42 of the right and left drive track assemblies 30, 40 to drive the respective tracks 34, 44. A flipper actuator module 55 is supported by the chassis 20 and is operable to rotate the flippers 50, 60. In some examples, the flippers 50, 60 are actuated in unison. In other examples, the flippers 50, 60 are actuated independently by right and left flipper actuators 55. The rear wheel 52, 62 of each flipper 50, 60 may be operatively coupled to the right and left motor drivers 36, 46 to drive the flipper tracks 54, 64 in unison with the drive tracks 34, 44.

Referring to FIGS. 1A-1D, a linkage 70 connects a deck assembly 80 to the chassis 20. The deck assembly 80 is configured to support a removable functional payload 90. The deck shifter 70 is also referred to as a center of gravity (CG) shifter and, as in the example shown, may be implemented as a linkage 70. In some implementations, the linkage 70 has a first end 701 rotatably connected to the chassis 20 at a first pivot 710, and a second end 703 rotatably connected to the deck assembly 80 at a second pivot 730. Both of the first and second pivots 710, 730 include respective independently controllable pivot drivers 720, 740 operable to rotatably position their corresponding pivots 710, 730 to control both fore-aft position and pitch orientation of the deck assembly 80 with respect to the chassis 20. The deck assembly 80 has leading and trailing ends 81, 83.

Figure 1F:
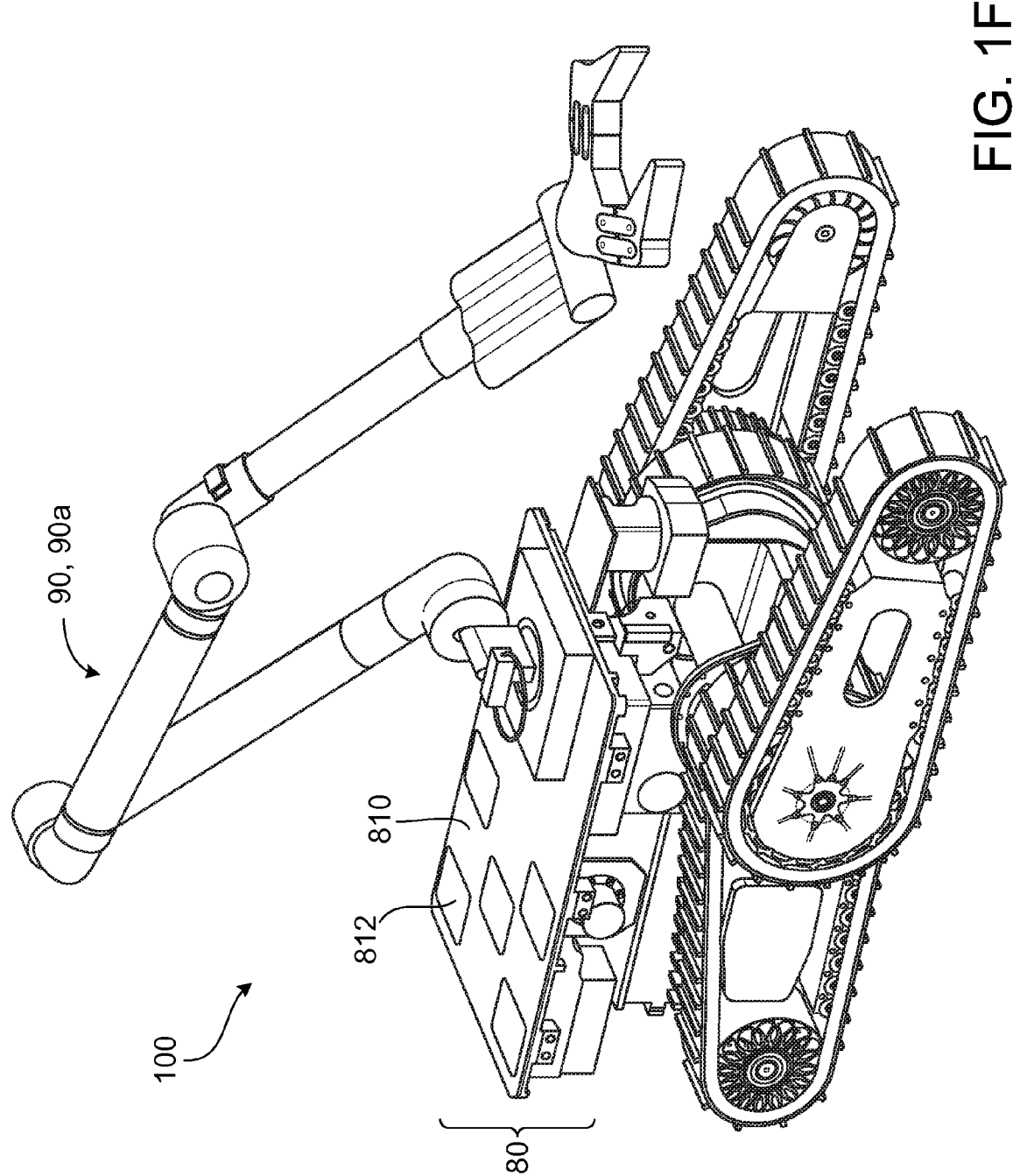
FIG. 1F is a perspective view of a robotic vehicle with a manipulator arm.

Referring again to FIGS. 1A-1F, the deck assembly 80 includes a payload deck 810 configured to receive and support one or more removable functional payloads 90. The functional payloads or modules 90 may include robotic arms 90a (as shown in FIG. 1F), a radio communication unit 90b (FIG. 1D) chemical, biological and radiation detectors, and a sample container. The robotic vehicle 100 automatically detects the presence and type of an installed functional payload 90 upon start-up. In some implementations, the deck assembly 80 includes one or more connection points or pads 812 for providing both a payload power link and a payload communication link to a received payload 90. Each functional payload connection point or pad 812 delivers power, ground and communications to a functional payload unit 90.

The robotic vehicle 100 includes a controller unit 220 (FIG. 1E) (optionally removable) operably connected to a drive system (e.g. the motor drivers 36, 46) of the chassis 20, the linkage pivot drivers 720, 740, and optionally any received payload 90 (via one or more of the connection points 812). In some examples, the controller 220 is housed in a deck base 805 of the deck assembly 80. In other examples, the controller 220 is disposed on the chassis 20.

The robotic vehicle 100 has an internal communication system or input/output (I/O) system 200 that allows components or resources 110 of the robotic vehicle 100 (e.g., the controller 220, the drive motors 36, 46, the linkage pivot drivers 720, 740, and optionally any received payloads 90) to communicate according to a resource access protocol 205 (also referred to as an Ether I/O protocol) over an internal electronic network 210. For example, the controller 220 recognizes the receipt and placement of a payload 90, such as the manipulator arm 90a shown in FIG. 1F, on the deck assembly 80 through communication over the I/O system 200 through one of the connection points 812. The controller 220 may execute a program (stored in memory thereon or communicated thereto) that identifies the received payload 90 and from the payload identification knows the size, weight, possibly range of movement, and/or other specifications of the payload to implement collision avoidance routines. For example, the payload 90 may communicate the payload specific data to the controller 220 upon placement or recognition thereof on the deck assembly 80, or the controller 220 may retrieve the payload specific data from memory or a connected source (e.g., wireless communication to a data source). The collision avoidance routines may be configured to prevent not only collision of the received payload with obstacles, but also self-collision with the robotic vehicle 100 (e.g., as for a manipulator arm 90a).

The resource access protocol 205 (Ether I/O protocol) is specifically designed for transferring information about robotic hardware over an internal network on the robotic vehicle. The robotic vehicle 100 operates in real time and the history of an action is not necessarily as important as the current state or status of the system, as the robotic vehicle 100 must perform real world tasks in a timely fashion even when the medium (e.g., the network 210) over which data is transferred my be unreliable (e.g., due to noise and electromagnetic fields (EMF)). The I/O system 200 provides a fast, low latency network that is compatible with not only the components of the robotic vehicle 100, but also received payloads 90 that have a variety of native physical connectors and operate according to different native communications protocols. Accordingly, in some implementations, the I/O system 200 allows one or more robot components and/or received payloads 90 to communicate with one another through the Ether I/O protocol.

Figure 2A:
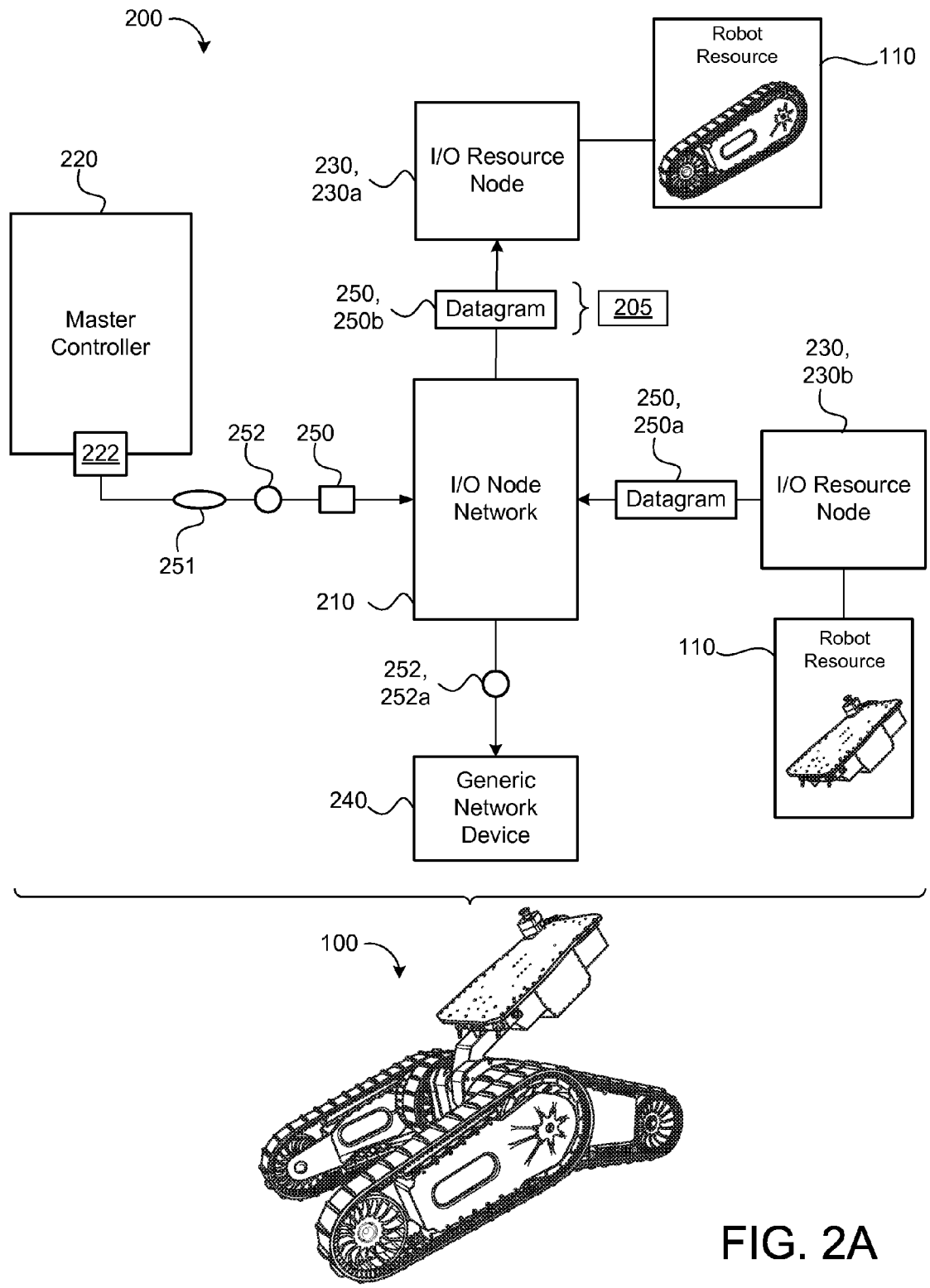
FIG. 2A is a schematic view of an exemplary input/output system.

Referring to FIG. 2A, the I/O system 200 includes an I/O node network 210 having a plurality of I/O resource nodes 230, 230a, 230b that each have addresses confined to robot resources 110 (e.g., actuators or sensors) within the network 210. The I/O resource nodes 230 communicate with each other or other devices, such as the controller 220, on the network 210 using the resource access protocol 205. Each resource node 230 has I/O or communication inferface(s) for communicating with each associated robot resource 110. An I/O resource node 230 may be application specific and/or interact with robot resources 110 physically in close proximity of the I/O resource node 230. The I/O resource nodes 230 can be a combination of hardware devices and software protocols for facilitating electronic communication within the robotic vehicle 100. In some examples, the I/O resource nodes 230 interface with custom-tailored hardware devices and software protocols, such as the drive motors 36, 46 and the linkage pivot drivers 720, 740, as well as industry-standard hardware devices and software protocols, such as for certain payloads 90. The network 210 may operate according to an Ethernet standard (IEEE 802.3 and related standards), although other network types are possible, including combinations of interoperable network types. For example, a system incorporating wireless networking could operate at least partially according to the IEEE 802.11 set of standards.

The I/O system 200 includes the robot controller 220 (e.g., a master controller) in communication with the network 210 and configured to send commands and receive responses from other components (i.e., resource nodes 230) connected to the I/O system 200. The robot controller 220 is physically integrated with the robotic vehicle 100 as one of its components. The robot controller 220 may be a microprocessor-based computing device, such as a general purpose computer, that connects to the network 210 via a network interface 222. For example, if the robot controller 220 is a general-purpose computer, the network interface 222 may be an industry-standard Ethernet controller card with an RJ-45 port. However, the I/O system 200 is not limited to any particular type of computer network hardware, and any combination of hardware types is possible. The robot controller 220 may include a combination of industry-standard hardware and custom-tailored hardware. Further, multiple robot controllers 220 may be linked to the network 210.

Each resource node 230 can interface with one or more robot components or resources 110 (e.g., the robot controller 220, the drive motors 36, 46, the linkage pivot drivers 720, 740, and optionally any received payloads 90) and is configured to send and receive electronic information from the robot component(s). For example, a resource node 230 can be connected to the drive motors 36, 46 of the robotic vehicle 100 or a payload 90 carried by the robotic vehicle 100, and provide electronic communications for the connected component or payload 90. Each resource node 230 can be connected to a combination of hardware and software components having accessible resources available to the robot controller 220 via the network 210. For example, several sensors or encoders in the same local area of the robotic vehicle 100 can be connected to a single resource node 230. While the robot controller 220 frequently sends commands and receives responses, the resource node 230 frequently receives commands and takes action accordingly, including preparing the responses. Furthermore, the resource node 230, like the robot controller 220, may include a combination of industry-standard and custom-tailored hardware. If the network 210 is an Ethernet network, for example, then each resource node 230 may incorporate industry-standard Ethernet hardware, and operate at least in part according to standard Ethernet protocols.

Figure 2B:
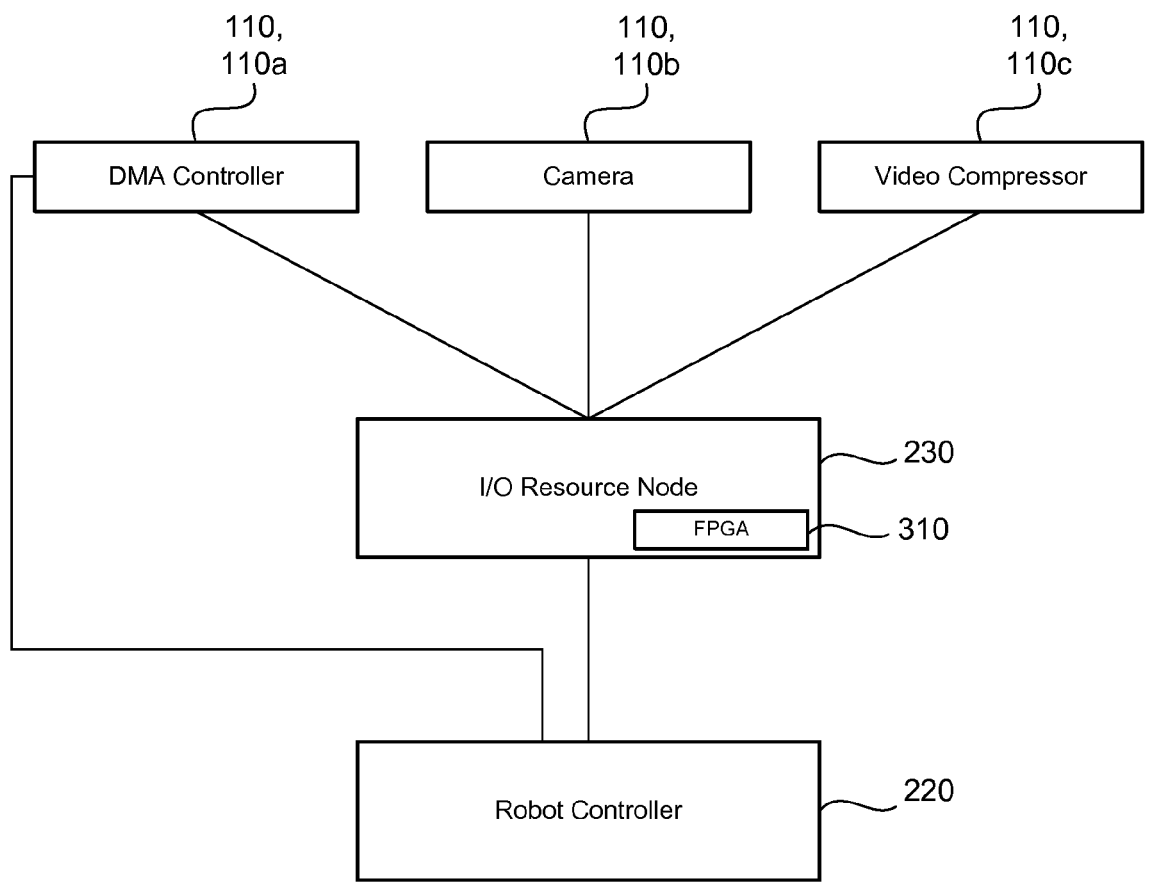
FIG. 2B is a schematic view of an exemplary I/O resource node connected to a robot controller and robot resources.

In some examples, the robot controller 220 queries information from the I/O resource nodes 230 and/or at least one of the I/O resource nodes 230 can stream information to the robot controller 220 (e.g., via direct memory access (DMA)). In some implementations, a DMA controller 110a, as a software resource, is in communication with an I/O resource node 230 to control direct memory access of hardware resources for the associated I/O resource node 230. The DMA controller 110a manages data locally at the I/O resource node 230 and is treated as a robot resource 230 in the I/O system 200. In the example shown in FIG. 2B, the I/O resource node 230 is connected a DMA controller 110a, a camera 110b, and a video compressor 110c. The camera 110b sends video data to memory of the I/O resource node 230, the video compressor 110c reads the memory of the I/O resource node 230, compresses the video data and has the compressed video data stored in additional memory of the I/O resource node 230. In some examples, the DMA controller 110a or its functionality, is integrated into the video compressor 110c. The DMA controller 110a sends or streams data (e.g., compressed video data) to the robot controller 220. For example, the video compressor 110c can notify the DMA controller 110a that a frame of video is available for access. The DMA controller 110a then streams the video frame to the robot controller 220 by direct memory access. In the example shown, the I/O resource node 230 includes a microprocessor 310 (e.g., FPGA) which has enough processing capability to process application specification data and signal processing for each connected robot resource 110.

The I/O system 200 provides relatively fast communications with low latency between the robot controller 220 and the I/O resource nodes 230 by using virtual local area networks (VLANs) to isolate traffic, so that components that generate data can have a dedicated channel (e.g., virtual network) with a threshold amount of communication capacity for communicating with other components in the I/O system 200 and/or the robot controller 220. Each robot resource 110 has bit rate requirement (low bit rate (LBR) or high bit rate (HBR)) and an optional quality of service (QOS) requirement. For example, a low bit rate with a quality of service requirement (LBR QOS) is for transmitting a relatively small amount of data, such as from an encoder, quickly, reliably, and with low latency, so as to provide closed loop motor control. Table 1 below provides exemplary bit rate and quality of service requirements for various robot resources 110.

TABLE 1

Robot Resource Communication Requirements

| Robot Resource | Communication Requirement | Robot Resource | Communication Requirement |
|---|---|---|---|
| Motor | | Vision | |
| Absolute Encoder | LBR QOS | Raw Video | HBR QOS |
| Relative Encoder | LBR QOS | Compressed Video | HBR QOS |
| Power Supply Voltage | LBR | Zoom/Aperture/Focus | LBR |
| Motor Current | LBR QOS | Light Control | LBR |
| Motor/Gripper Force | LBR QOS | Light Power Usage | LBR |
| Motor Temperature | LBR | Video Multiplex | LBR |
| Safety/Stop System | LBR QOS | Temperature | LBR |
| Mechanical Brakes | LBR | Pan/Tilt Motors | (See Motor) |
| Brake Status | LBR | 3D Video | HBR QOS |
| Short Circuit Protection | LBR QOS | | |
| Communication | | Power | |
| Radios | LBR | Charge Subsystem | LBR |
| Frequency Control | LBR | Temperature | LBR |
| Power Control | LBR | Current/Voltage | LBR/HBR |
| Active Antenna Motion | (see motor) | Battery Chemistry | LBR |
| | | Engine Braking Power Dissipation | HBR QOS |
| Audio | | Sensors | |
| Speaker/Amplifier | LBR | GPS | LBR |
| Audio Decoder | HBR QOS | Compass | LBR |
| Audio Encoder | HBR QOS | Tilt/Accelerometer/Drop | LBR QOS |
| | | Sonar | HBR QOS |
| | | Radar | HBR QOS |
| | | Laser Scanner | HBR QOS |

Some or all of the data at an I/O resource node 230 (e.g., from all connected robot resources 110) can be grouped together and time stamped for delivery. In some implementations, all data with a compatible quality of service (QOS) requirement (e.g., the same or less) can be aggregated into a packet (e.g., Ethernet packet) and time stamped. There is typically a minimum size of a packet. Once the packet is filled with data of a certain QOS level, additional data of a lower QOS level can be added until the packet is filled to capacity, so as to not waste space in the packet.

Rather than using time slicing, the I/O system 200 uses time stamps and does not worry about old data. Each I/O resource node 230 has a real-time clock for time stamping each packet sent over the network 210 as well as locally important data for control. As the low latency data is time stamped, the time stamps can be used to organize and interpolate data. The QOS guarantee (via the VLANs) provides a certain amount of quality and reliability of the data. Due to the fast, low latency aspect of the I/O system 200, data cycles are fast enough such that old data does not need to be managed or considered. The fast, low latency aspect of the I/O system 200 can be achieved by using relatively small headers (e.g., 4-8 bytes) or no headers at all in datagrams 250. In some examples, the data is transferred (read/writes) in 32 bit chunks.

Devices operating according to the resource access protocol 205 send and receive datagrams 250, 250a, 250b, 250c (FIG. 6A) containing discrete units of data formatted in a manner defined by the resource access protocol 205. For example, one resource node 230a may be sending a datagram 250a over the network 210 to the robot controller 220, while at the same time another resource node 230b may be receiving a different datagram 250b over the network 210 from the robot controller 220. These datagrams 250, 250a, 250b may contain commands from the robot controller 220, or responses to commands from the resource node 230. The resource access protocol 205 can operate in concert with another network protocol required by the physical network hardware. For example, the resource access protocol 205 can operate over an Ethernet network.

Because the robotic vehicle 100 will not necessarily need all of the functionality of the industry-standard protocols often used with an Ethernet network, the resource access protocol 205 is designed to primarily provide communications functionality likely to be used by the I/O system 200 of the robotic vehicle 100, including communicating information about the components of the robotic vehicle 100 amongst themselves. For example, communications between the robot controller 220 and resource nodes 230 are tailored to the capabilities and operations of the robotic vehicle 100, and so the resource access protocol 205 does not need to be capable of handling the greater variety of communications that a general-purpose network protocol might be suited for. Rather, the communications can be focused to communications about sensor data, actuator movement, and other specific types of information used by the robotic vehicle 100. As a result, the resource access protocol 205 is less complex than an industry-standard protocol.

The resource node 230 may also be capable of transmitting and receiving information in the form of packets 251, instead of datagrams 250. A packet 251 can have built-in provisions for automatic retransmission or maintaining state between packets 251, while a datagram 250 does not necessarily include these features. Furthermore, a resource node 230 may communicate with some devices using the resource access protocol 205, and other devices with other network protocols, or use multiple protocols to communicate with the same device at different times.

In some implementations, the robot controller 220 and the resource nodes 230 share the network 210 with other devices. For example, a network device 240 connected to the network 210 can take any form. The network device 240 may be controlled by the robot controller 220, but it need not be. In examples where the network 210 is an Ethernet network, the network device 240 may be an Ethernet device using industry standard networking protocols, beyond the protocols associated with the Ethernet standard itself. For example, Internet Protocol (IP) is a standard protocol capable of being carried over an Ethernet network, and many commercially-sold network devices are configured to operate according to IP in concert with Ethernet protocols. The network device 240 may communicate with other devices according to IP over the same network 210 used by resource nodes 230 to communicate using the resource access protocol 205. In some examples, the network device 240 includes custom-tailored hardware or use custom-tailored protocols different from the resource access protocol 205.

As indicated above, the resource access protocol 205 is less complex than an industry-standard protocol that might be used with a network device 240 other than a robot controller 220 and a resource node 230. As a result, the robot controller 220 and resource nodes 230 can communicate with each other using messages of lesser complexity than the messages that the network device 240 might use. For example, the messages have fewer headers and other overhead used in data transmission. In some examples, the messages have a header that accommodates data as few as four bytes. Messages of lesser complexity generally can be transmitted over the network 210 with less latency and with less data loss potentially caused by components of the robotic vehicle 100 that produce electrical interference in the vicinity of the network 210. Messages of lesser complexity can also be processed more quickly by their respective sender and recipient. Further, a robot controller 220 or a resource node 230 can retransmit the same message for the purpose of redundancy with a minimum of additional processing overhead. By comparison, an industry-standard protocol can co-exist on the same network 210 for use by other network devices 240, but may have messages of greater complexity and thus require more processing and transmission time.

In the example shown in FIG. 2, the network device 240 may send or receive a data unit 252a defined by a protocol, such as internet protocol (IP) or another standard protocol. The data unit 252a may be a generic packet, as defined by, e.g., the transmission control protocol (TCP), or a generic datagram, defined by, e.g., the user datagram protocol (UDP). Both TCP and UDP, as well as other packet-based or datagram-based protocols, can be used in conjunction with IP. The data unit 252a can be formatted according to any of these protocols, including another custom-tailored protocol other than the resource access protocol 205.

In some implementations, two or more of the devices (e.g., robot controllers 220, resource nodes 230, network devices 240) linked to the network 210 operate without synchronization between the devices. Any device can transmit a datagram 250, packet 251, or other data unit 252 at any time. The network 210 provides this asynchronous communication ability by queuing, buffering, and switching the datagrams 250, packets 251, or other data units 252 along the path to their respective destinations.

The robot controller 220, in some examples, operates according to one or more standard protocols, or a custom-tailored protocol, while concurrently operating according to the resource access protocol 205. As a result, the robot controller 220 can communicate with a variety of devices simultaneously, each according to an appropriate communications protocol. For example, the robot controller 220 may issue a command to a resource node 230 via a datagram 250 of the resource access protocol 205, and also issue a command to a network device 240 also configured to receive commands. Thus, a single physical network can be used with a variety of devices and their respective communications protocols, and a single robot controller 220 (or a collection of robot controllers 220 working independently or in concert) can control any of the connected devices, if so configured. The arrangement of the physical network is not limited by the protocols used by the devices, and any type of device can be linked to the network at any network interface point.

Figure 3A:
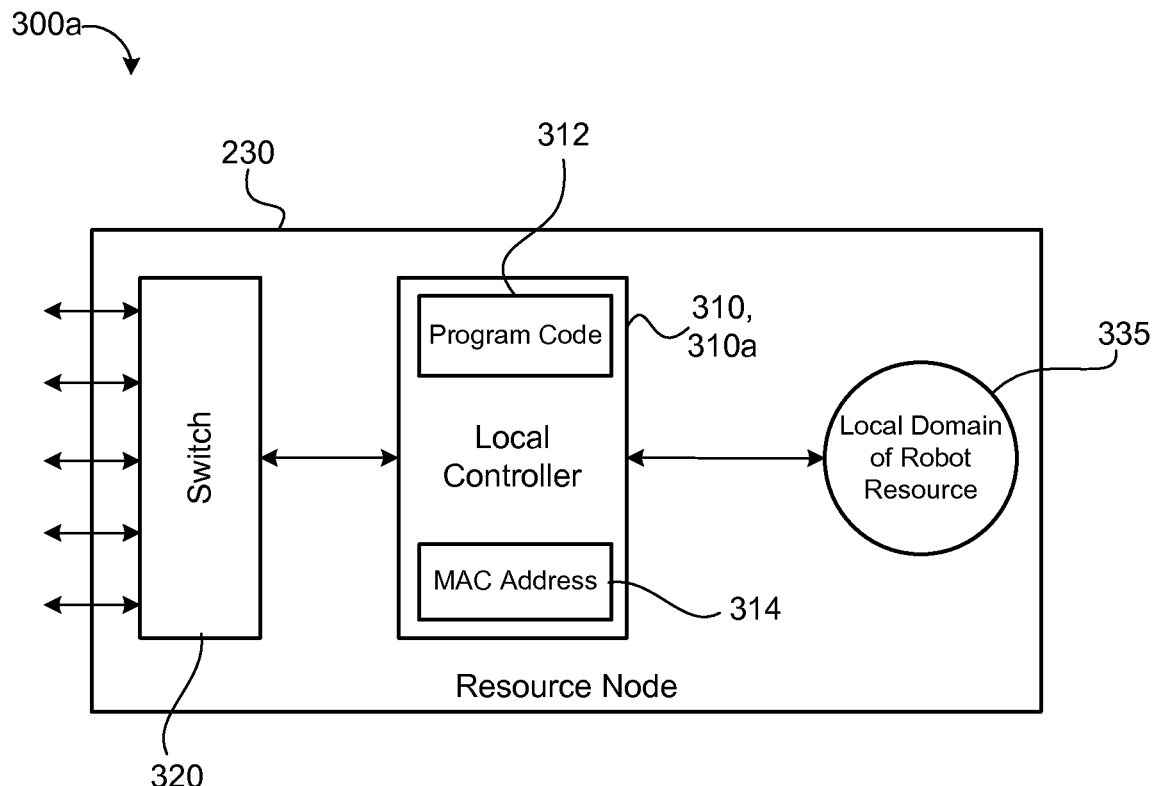
FIGS. 3A-3C are schematic views of exemplary network device layouts.

Each resource node 230 can have any of several hardware configurations. In some implementations, each resource node 230 includes direct memory access, a local controller 310 (having access to a local device domain using, e.g., I/O terminals), and a hardware interface such as a switch 320. Referring to FIG. 3A, a resource node 230 is configured to communicate over an Ethernet network. A resource node layout 300a includes a local controller 310a configured to handle interactions with other components. The local controller 310a may include any of a number of hardware logic devices, including, for example, but not limited to, a microprocessor, a microcontroller, an application specific integrated circuit (ASIC), or a field programmable gate array (FPGA). The local controller 310a may include a combination of multiple devices of the same type or different types. The local controller 310a is programmed with device-specific program code 312. For example, if the local controller 310a is a FPGA, the program code 312 may be specified in any one of a number of hardware description languages, including, for example, Verilog or VHSIC Hardware Description Language (VHDL). If the local controller 310a is a microprocessor or microcontroller, the program code 312 may be specified in an assembly language native to the particular type of microchip, or it may be a compiled or interpreted high-level language, or another type of appropriate code. If the local controller 310a is an ASIC, the program code 312 may be optional, or may be specified in a custom-tailored format, for example. The local controller 310a may be configured to have a media access control (MAC) address 314 that uniquely identifies the resource node 230 to other devices on the network 210.

The local controller 310a is linked to a switch 320, which is an active hardware interface enabling a physical connection to the rest of the network 210. The switch 320 can have I/O terminals, one or more physical communications ports, such as an RJ-45 port common to Ethernet-based devices, or a modified or custom port type. The ports may connect to other resource nodes 230, robot controllers 220, or other devices. Furthermore, the switch 320 can contain additional circuitry, including microprocessors or other digital logic components configured to handle network-specific tasks. For example, the switch 320 may be an Ethernet switch.

The local controller 310a is also linked to a local device domain 335, containing the components of the device that are not directly linked to the network 210. These components include resources that the resource node 300a makes available to the other network devices. These resources can include robotic components or payloads 90, such as motors, sensors, and other electronic devices.

Figure 3B:
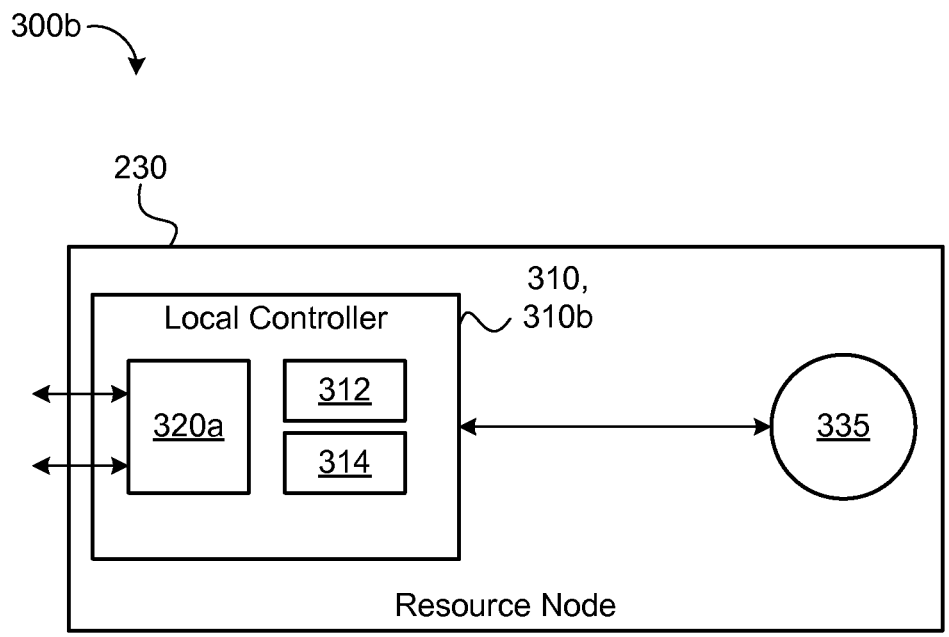

Referring to FIG. 3B, a resource node layout 300b has many elements in common with the first resource node layout 300a, including program code 312, a MAC address 314, and a local control domain 335. The resource node layout 300b includes a local controller 310b that has a control entity 311 for communicating with the local control domain 335, and switch 320a for communicating with the network 210. Unlike the resource node layout 300a shown in FIG. 3A, resource node layout 300b handles all network activity directly on the local controller 310b. In this configuration, the local controller 310b takes in all network traffic (e.g., datagrams 250) passing over the switch 320a and actively passes the traffic back out the switch 320a, further performing one or more operations on any of the traffic.

Figure 3C:
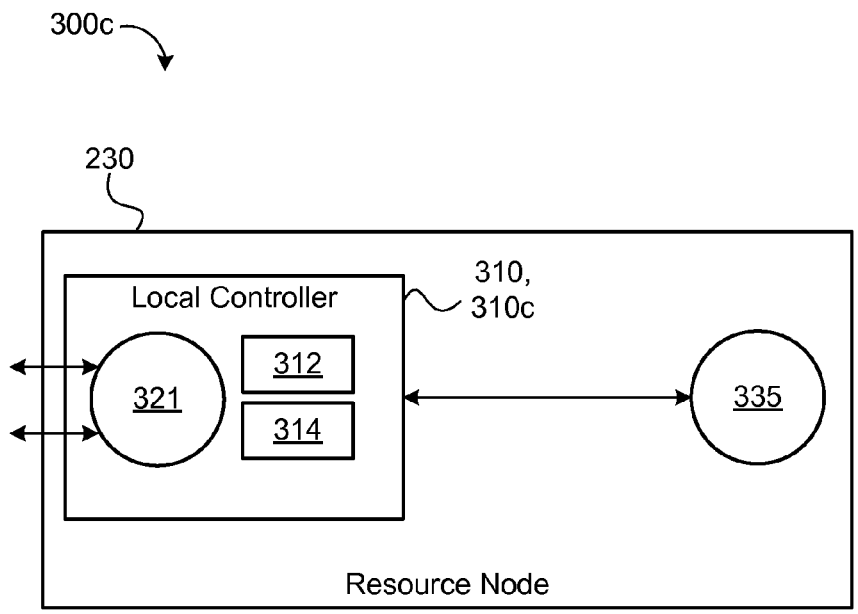

Referring to FIG. 3C, a resource node layout 300c, like the above examples, also has program code 312, a MAC address 314, and a local control domain 335. The resource node layout 300c includes a local controller 310c; however, unlike resource node layouts 300a and 300b, resource node layout 300c does not include an active hardware interface, but rather a passive hardware interface 321. The passive hardware interface 321 serves as an electronic link between the resource node 230 and other network elements, but does not necessarily have any further capabilities. The passive hardware interface 321 can be a standard physical communications port, such as an RJ-45 port, and can be physically wired directly to the local controller 310c. The exemplary device layouts shown in FIGS. 3A-3C for the resource node layouts 300a, 300b, 300c can be used for devices other than a resource node. For example, a robot controller 220 may also be arranged according to one of the layouts shown.

Figure 4:
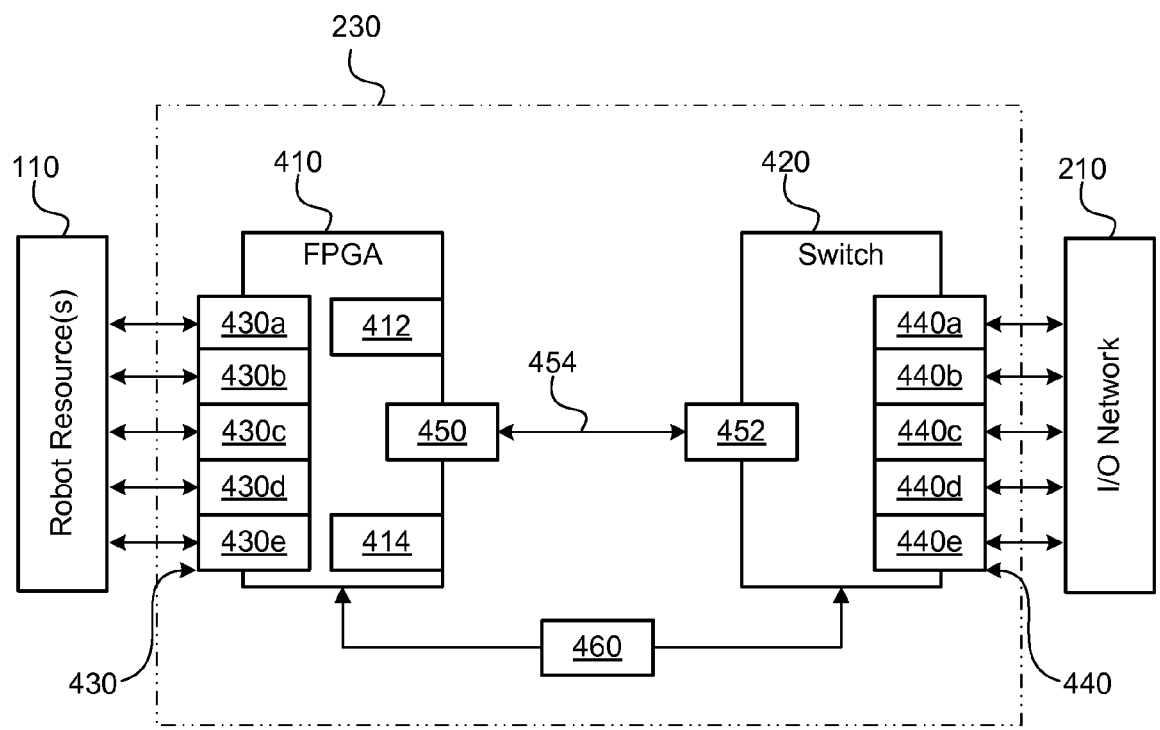
FIG. 4 is a schematic view of an exemplary hardware configuration of a network device.

FIG. 4 shows an exemplary resource node 230 configured according to the device layout 300a shown in FIG. 3A. The resource node 230 includes an FPGA 410 as the local controller 310a, which is connected to a programmable read-only memory (PROM) 412. The PROM 412 contains device-specific program code, and could contain other data used by the FPGA 410. The PROM 412 may be an electrically erasable memory, a flash memory, or another kind of memory. The FPGA 410 may also have multiple PROMs 412. The FPGA 410 has a MAC address 414 used in conjunction with network communication. In some examples, the FPGA 410 also has a set of input/output ports 430a, 430b, 430c, 430d, 430e. Each input/output port 430a, 430b, 430c, 430d, 430e (generally referenced as 430) corresponds to a digital input on the FPGA 410, such as a pin connector or a set of pin connectors, although the port could also have additional elements, such as an analog-to-digital converter. Each input/output port 430a, 430b, 430c, 430d, 430e may be connected to an electronic component 110 (i.e. robot resource) of the robotic vehicle 100 (e.g., the controller 220, the drive motors 36, 46, the linkage pivot drivers 720, 740, and optionally any received payloads 90 (such as the manipulator arm 90a, sensors, etc.).

The resource node 230 includes a network switch 420, as the active hardware interface 320. The network switch 420 has a set of switch ports 440a, 440b, 440c, 440d, 440e (generally referenced as 440). Each switch port 440a, 440b, 440c, 440d, 440e may provide a connection to another network device. Each switch port 440a, 440b, 440c, 440d, 440e may connect to, for example, another resource node 230, a robot controller 220, a payload 90 suitable for a robotics application, another network switch 420 or a network hub, or another kind of device. In the example shown, the first switch port 440a connects the resource node 230 to the network 210. The switch port 440a may link to another network switch 420, which in turn could be connected to other switches. Similarly, the last switch port 440e connects other resource nodes 230 or devices to the network 210 by passing traffic into the last port 440e, through the network switch 420, and out the first switch port 440a. The network switch 420 may perform one or more operations on any of the traffic passing through as part of this process. Some of the remaining switch ports 440b, 440c, 440d might serve as links to payloads 90, a robot controller 220, or any other kind of device compatible with the network switch 420. The switch ports 440a, 440b, 440c, 440d, 440e are available for use with any device that requires access to the network 210, and need not have functionality related to the functionality of the resource node 230.

The network switch 420 may include a number of switch ports beyond switch ports 440a, 440b, 440c, 440d, 440e. At least one switch port 440a, 440b, 440c, 440d, 440e is used to connect to the network 210, for example. In some situations, the network 210 will include only one device, such as a robot controller 220. In other situations, several of the switch ports 440a, 440b, 440c, 440d, 440e may be used to connect to different branches of the network 210.

In some examples, it may be advantageous to place several networkable devices, such as robotic payloads 90 or other resource nodes 230, in physical proximity to the robot resources 110 connected to the input/output ports 430a, 430b, 430c, 430d, 430e of the FPGA 410. If the networkable devices are already close by, then connecting these devices to any of the network switch ports 440a, 440b, 440c, 440d, 440e is convenient, although the flexible nature of the network 210 allows the devices to be connected anywhere on the network 210. For example, the right drive motor 36 and the flipper actuator 55 are disposed in the same local area on the chassis 20 and may be connected to the same resource node 230. Similarly, the left drive motor 46 and the first linkage pivot driver 720 are disposed in the same local area on the chassis 20 and may be connected to the same resource node 230. As a result, one device may be connected to another device elsewhere on the network 210 and still communicate with the resource node 230 through the network connections on the first switch port 440a or the last switch port 440e, or any other port connecting to the network 210. In the context of the robotic vehicle 100 shown in FIGS. 1A-1E, some robot components 110 in one portion of the robotic vehicle 100 (e.g., the chassis 20) can be connected to the input/output ports 430a, 430b, 430c, 430d, 430e, while other robot components 110 in another portion of the robotic vehicle 100 (e.g., the deck assembly 80) can be connected to the switch ports 440a, 440b, 440c, 440d, 440e.

Connecting a payload 90, resource node 230, robot controller 220, or other network device to one of the switch ports 440a, 440b, 440c, 440d, 440e of the network switch 420 may have other advantages. For example, if a device communicates with the FPGA 410 on a regular basis, then the communication latency between the device and the FPGA 410 may be lowest if the device is linked to the network switch 420, as opposed to elsewhere on the network 210.

The FPGA 410 and the network switch 420 may be connected by a media-independent interface (MII) 450 integrated with the FPGA 410, and another MII 452 integrated with the network switch 420. A connection 454 between the two MIIs 450, 452 may take any form, and could be either an industry-standard physical connection, a custom-tailored physical connection, a wireless connection, or another suitable type of communication connection. In some examples, the rate of communication between the two MIIs 450, 452 is regulated by an oscillator 460. Other media independent interfaces 450 may be used as well. Examples of other media independent interfaces 450 include, but are not limited to, Reduced Media independent Interface (RMII), Gigamit MII (GMII), Reduced Gigabit (RGMII), Serial GMII, etc.

In some examples, the resource node 230 may not have input/output ports 430a, 430b, 430c, 430d, 430e, and the resource node 230 acts as a data storage device in communication with the network 210.

Figure 5A:
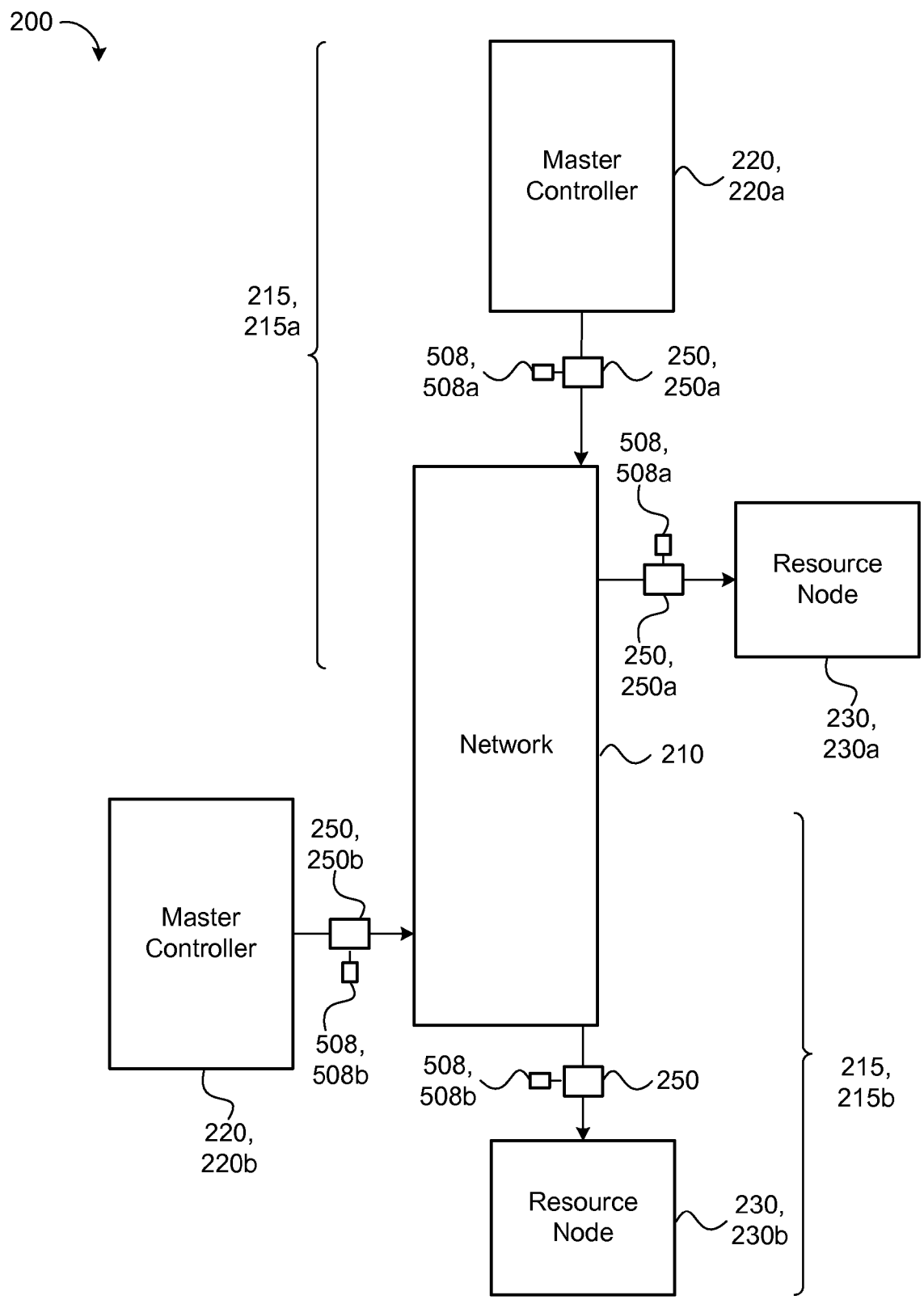
FIG. 5A is a schematic view of an exemplary input/output system.

Referring to FIG. 5A, in some implementations, the I/O system 200 can have multiple virtual networks 215, 215a, 215b. Each virtual network 215, 215a, 215b operates over the same physical network 210. In the example shown, some datagrams 250, 250a belong to one virtual network 215, 215a, and other datagrams 250, 250b belong to another virtual network 215, 215b. The datagrams 250, 250a, 250b are each associated with a Virtual Local Area Network (VLAN) tag 508, 508a, 508b identifying a virtual network 215, 215a, 215b. The datagrams 250, 250a belonging to the first virtual network 215, 215a all have one type of VLAN tag 508, 508a, and the datagrams belonging to the second virtual network 215, 215b all have another type of VLAN tag 508, 508a. The VLAN tags 508, 508a, 508b are assigned by an originating network device such as a robot controller 220, 220a, 220b or a resource node 230, 230a, 230b, all present on the same network 210. One robot controller 220, 220a and resource node 230, 230a may communicate using one virtual network 215, 215a, while another robot controller 220, 220b and resource node 230, 230b may communicate using another virtual network 215, 215b.

Figure 5B:
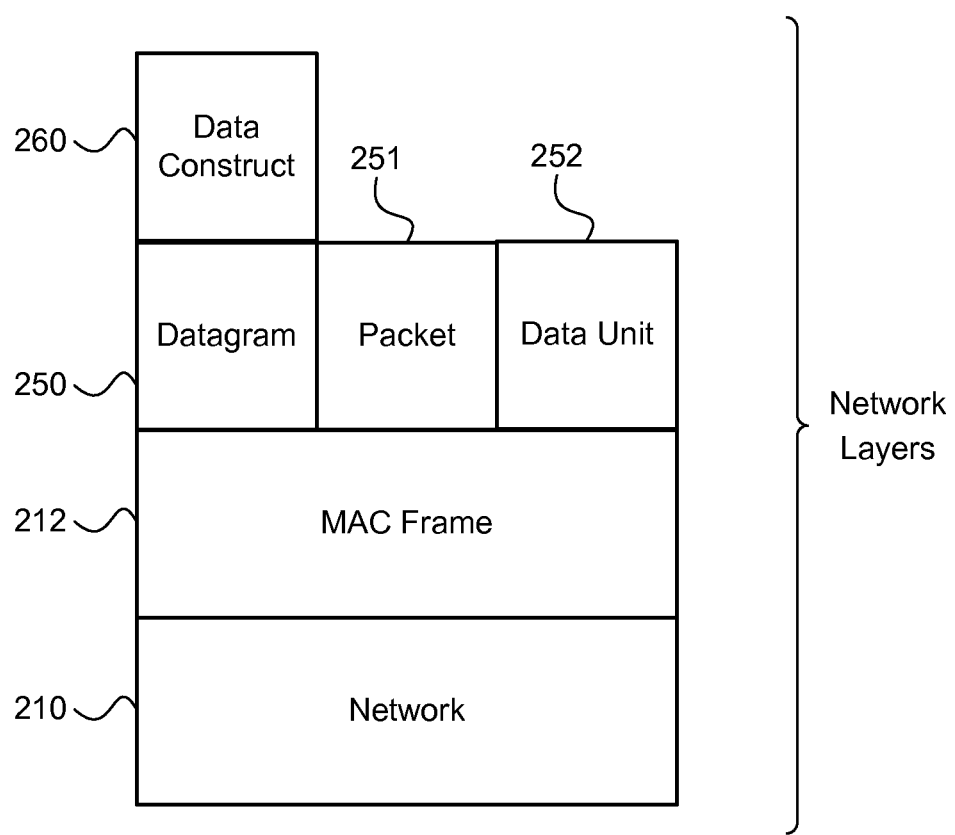
FIG. 5B is a schematic view of layers of communication within an exemplary input/output system.

As previously shown in FIG. 2, a resource access protocol 205 datagram 250 can co-exist on a network 210 with a data unit 252 defined according to a different protocol. Referring to FIG. 5B, in the exemplary Ethernet-based network 210, this is accomplished through the use of MAC frames 212. The network 210 uses a MAC frame 212 as the most basic unit of communication between two network devices having a direct link between them, and a MAC frame 212 can contain other units of data defined by any of a number of protocols, such as the resource access protocol 205. This mechanism allows the network 210 to have multiple "layers" of communication. MAC frames 212 are defined by the protocols on one layer of communication, and the MAC frames can contain datagrams 250, packets 251, or other data units 252 defined by the protocols on another layer of communication. In turn, a datagram 250, for example, can contain another data construct 260 defined by protocols on yet another layer of communication.

Figure 5C:
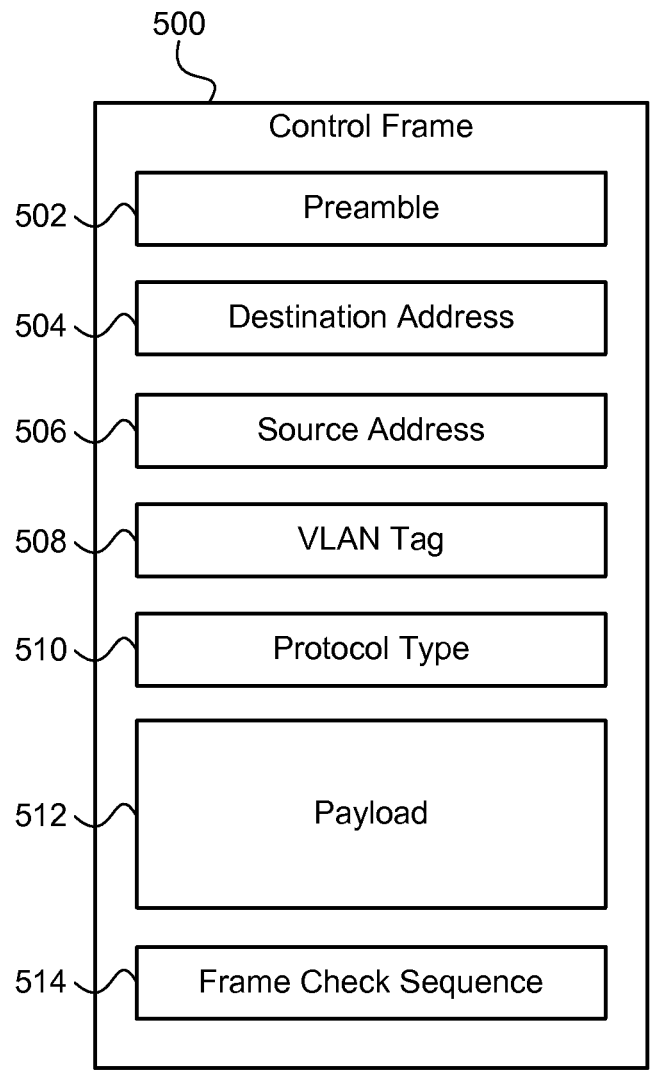
FIG. 5C is a schematic view of an exemplary control frame.

Referring to FIG. 5C, in some implementations, the resource access protocol 205 uses control frames 500 to facilitate the transmission of resource access protocol 205 datagrams 250. The exemplary control frame 500 shown is a MAC frame 212 compatible with a network 210 conforming to the Ethernet set of standards. The control frame 500 has a preamble 502 identifying the unit of data as being a control frame 500. Next, the control frame 500 has a destination address 504 identifying the device on the network 210 (e.g., a robot controller 220, a resource node 230, or a network device 240) to which the control frame 500 is to be delivered. The destination address 504 can be an Ethernet MAC address, and can also indicate more than one device. For example, the Ethernet standard allows for multicast addressing, whereby a multicast frame is intended for receipt by all devices on the network 210. Similarly, the control frame 500 has a source address 506 that indicates the device (e.g., the robot controller 220, a resource node 230, or a network device 240) from where the control frame 500 originated. In some implementations, the control frame 500 has an optional VLAN tag 508 identifying a virtual network 215 within the physical network 210. The control frame 500 includes a protocol type 510 identifying the type of data carried by the control frame 500. In the case of the control frame 500 containing a resource access protocol 205 datagram 250, the protocol type will be a unique value shared by all frames 500 carrying such datagrams 250. The control frame 500 has a payload 512 constituting the data carried by the control frame, which here is at least a portion of the resource access protocol 205 datagram 250. The control frame 500 may include a frame check sequence 514 which is a checksum or other verification sequence that can be used to evaluate the integrity of the control frame 500 after transmission.

Figure 5D:
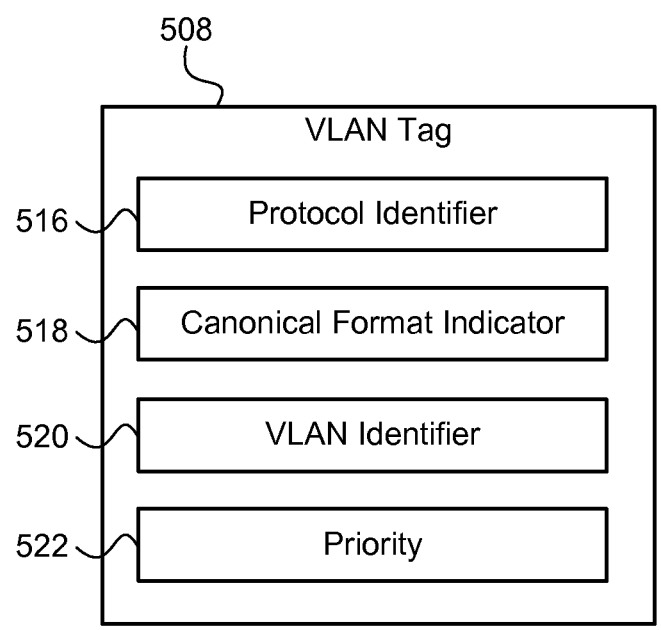
FIG. 5D is a schematic view of an exemplary virtual local area network tag.

Referring to FIG. 5D, the optional VLAN tag 508 of the control frame 500 identifies one of potentially several virtual networks 215 operating over the physical network 210. The VLAN tag 508 includes a protocol identifier 516 indicating the standard used to define the format of the VLAN tag 508. In some implementations, the VLAN tag 508 is formatted according to the IEEE 802.1Q standard for virtual networks and the IEEE 802.1p standard for priority, respectively. The VLAN tag 508 also includes a canonical format indicator 518 that can specify if the control frame 500 should or should not be forwarded without modification to the format, depending on the requirements of a given network 210.

In some implementations, the VLAN tag 508 includes a VLAN identifier 520 specifying a virtual network 215 to which the control frame 500 belongs. The virtual network 215 is a construct originating with the VLAN tag 508, and in some examples, the VLAN tag 508 can specify up to 4096 virtual networks 215 Another type of tag may be implemented to specify a greater or lesser number of virtual networks 215. Network devices can be configured to handle traffic differently based on the virtual network 215. For example, any or all of the control frames 500 belonging to one virtual network 215 can be handled by a given network device according to one set of processing rules, and any or all of the control frames 500 belonging to a different virtual network 215 can be handled by the network device according to a different set of processing rules.

In some implementations, the VLAN tag 508 includes a priority 518 for the control frame 500. The VLAN tag 508 may be capable of eight priority levels, where a higher priority value indicates to a network device that the control frame 500 should be delivered ahead of other control frames 500 with a lower priority value. The ability of the VLAN tag 508 to specify a virtual network 215 is independent of the ability of the VLAN tag 508 to specify a priority. For example, all of the control frames 500 on a network 210 having a VLAN tag 508 can indicate the same virtual network 215, while some control frames 500 may still have a different priority than other control frames 500. Similarly, more than one virtual network 215 can be defined, even if all of the control frames 500 have the same priority.

The ability to indicate or assign a virtual network 215 and a priority 518 to VLAN tag 508 allows network traffic to travel in a relatively efficient manner as compared to a network 210 lacking such ability. For example, because a network 210 may include many devices, each operating according to one or more of several protocols, the devices that operate according to the resource access protocol 205 can set control frames 500 to have the highest priority. Network devices 240 can be configured to recognize this priority and, when processing multiple control frames 500 of different types, handle the highest priority control frame 500 first, ahead of the others. Thus, the control frames 500 will be delivered without unnecessary interference from data carried according to a different protocol.

As another example, control frames 500 can be set to belong to a particular virtual network 215. Network devices can be configured to recognize the boundaries of virtual networks 215 and selectively recognize and re-transmit control frames 500 according to their respective virtual networks 215. Thus, the devices do not deliver control frames 500 to any other devices beyond the devices that require the control frames 500. This capability can also apply in situations in which multiple robot controllers 220 are present on a single network 210. For example, each robot controller 220 can be assigned to an individual virtual network 215, and resource nodes 230 can be configured to only process control frames 500 belonging to the virtual network 215 of a particular designated robot controller 220. Further, other network devices can be configured to ensure that a robot controller's control frames 500 do not travel to devices far beyond those outside its realm of control. Thus, robot controllers 220 and resource nodes 230 can spend less time and fewer resources handling control frames 500 that are not actually pertinent, rather than evaluating many control frames 500 ultimately intended for another device.

Figure 6A:
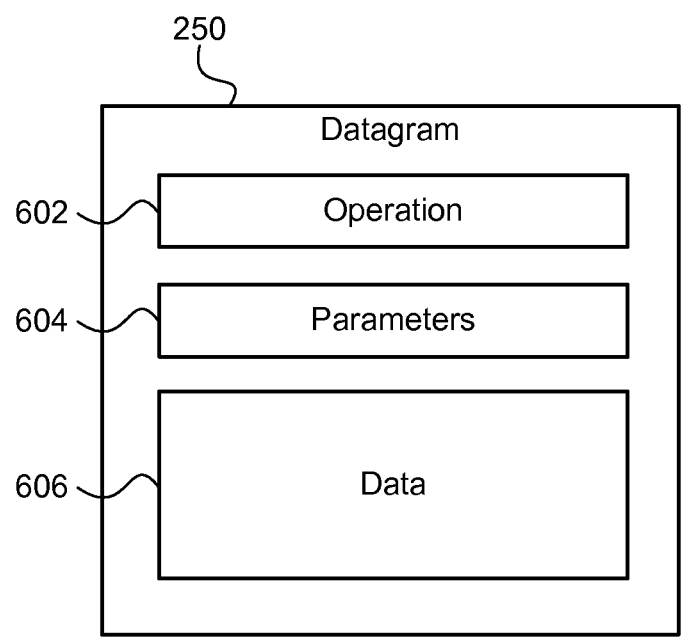
FIG. 6A is a schematic view of an exemplary resource access protocol datagram.

Referring to FIG. 6A, a resource access protocol 205 datagram 250 contains data communicated between devices using the resource access protocol 205, such as a robot controller 220 or a resource node 230. The datagram 250 has an operation 602 specifying the functional purpose of the datagram 250. For example, the operation 602 may be a command from the robot controller 220 to be carried out by a resource node 230 receiving the datagram 250. The operation 602 is represented in the datagram 250 by a corresponding code, for example, a numeric code. The datagram 250 also includes parameters 604 for use in carrying out the operation 602. For example, if the operation 602 is "Write," then a parameter 604 may be a memory location to write to. The datagram 250 may also include data 606 for use in carrying out the operation 602. For example, if the operation 602 is "Write," then the data 606 may be information to be written. The data 606 can take any form as needed by the operation 602. The smallest discrete unit of data, for example, a word, depends on the capabilities of the robot controller 220 and any resource nodes 230. A common word length is 32 bits, although 8-bit words, 16-bit words, 64-bit words, and words of other sizes may be possible depending on the implementation.

Table 2 shows examples of operations supported by the resource access protocol 205, although other operations are possible.

TABLE 2

Resource access protocol 205 Operations

| Operation | Parameters | Description |
| --- | --- | --- |
| Read | [Address], [Length] | Requests the data starting at [Address] for [Length] words |
| Long Read | [Address], [Length], [Reserved] | Requests the data starting at [Address] for [Length] words, the reply to contain the tag [Reserved] |
| Write | [Address], [Length], [Data] | Writes [Data] to [Length] words, starting at [Address] |
| Long Write | [Address], [Length], [Reserved], [Data] | Writes [Data] to [Length] words, starting at [Address |
| Read Reply | [Address], [Length], [Data] | Returns [Data] of [Length] words, having been read starting at [Address], in response to a Read operation. |
| Long Read Reply | [Address], [Length], [Reserved], [Data] | Returns [Data] of [Length] words, having been read starting at [Address], and also returns [Reserved], in response to a Read operation. |
| Echo Request | [Number] | Requests an Echo Reply operation containing the tag [Number] |
| Echo Reply | [Number] | Returns the tag [Number] in response to an Echo Request operation |
| Interrupt | [Function], [Status] | Requests an intervention on behalf of [Function], reporting [Status] |

TABLE 2-continued

Resource access protocol 205 Operations

| Operation | Parameters | Description |
| --- | --- | --- |
| Node Reset | [Reserved] | Commands the node to reset, supplying [Reserved] |
| DMA Read | [Batch], [Channel], [Length], [Address] | Requests the data starting at [Address] for [Length] words, the reply to be tagged with [Batch] and [Channel] |
| DMA Read Reply | [Batch], [Channel], [Length], [Address], [Data] | Returns [Data] of [Length] words, having been read starting at [Address], and also returns [Batch] and [Channel], in response to a DMA Read operation. |

Some operations support a tag, such as "Reserved," "Batch," or "Channel." These tags are provided for the benefit of a node transmitting an operation that will elicit a reply. For example, if a robot controller 220 sends multiple "Long Read" operations to a resource node 230, then the robot controller 220 can give each operation a unique value for the "Reserved" parameter. This functionality can be used in any of a number of situations. For example, if the robot controller 220 is sending duplicate operations for the purpose of redundancy, the robot controller 220 can identify duplicate, redundant responses by examining the "Reserved" parameter in each response. Similarly, if the robot controller 220 is sending two otherwise identical operations that have been coincidentally generated by different internal components of the robot controller 220, the robot controller 220 can tag each operation using the "Reserved" parameter to route the responses to the proper respective internal component. The "Batch" and "Channel" parameters are used as tags by Direct Memory Access (DMA) operations.

Figure 6B:
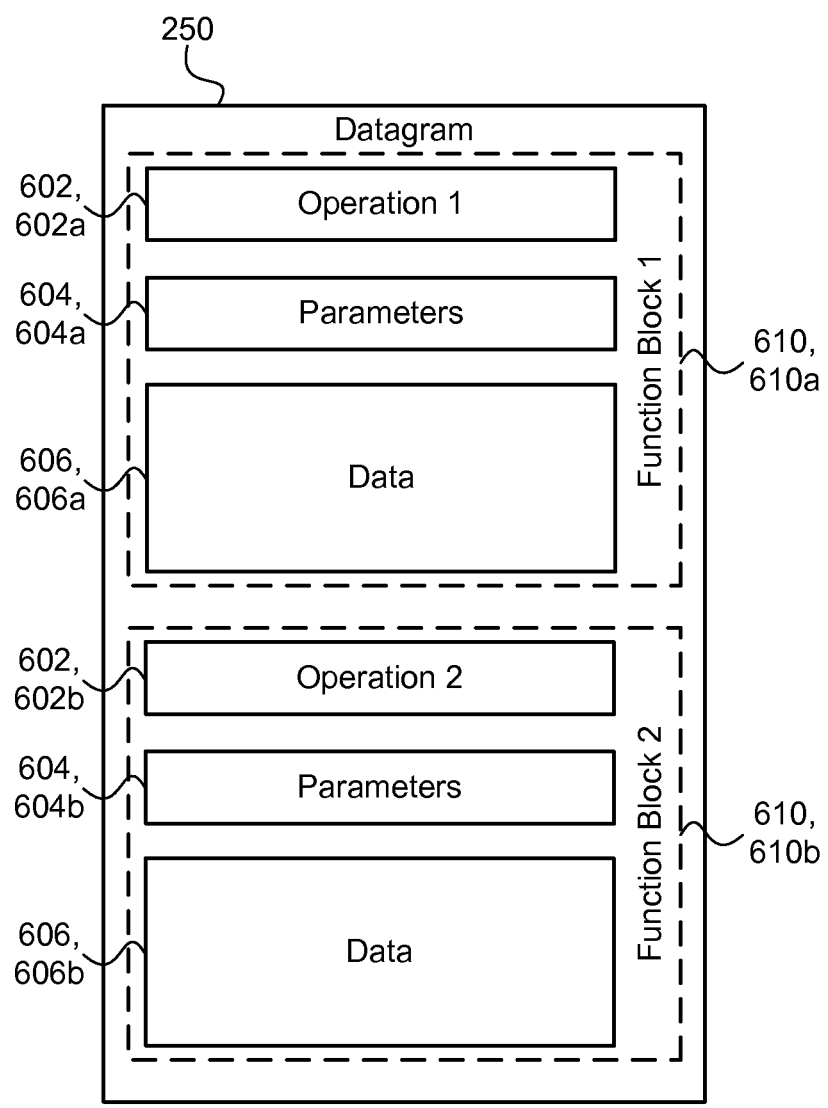
FIG. 6B is a schematic view of an exemplary resource access protocol datagram.

Referring to FIG. 6B, in some implementations, a datagram 250 can contain multiple operations 602, 602a, 602b. The datagram 250 can also contain parameters 604, 604a, 604b and data 606, 606a, 606b associated with each of the operations 602, 602a, 602b. If a datagram contains multiple operations 602, 602a, 602b, a robot controller 220, resource node 230, or other resource access protocol 205 device can handle the operations 602, 602a, 602b sequentially before handling any other operations 602 contained in other datagrams 250. The operations 602, 602a, 602b and their respective associated parameters 604, 604a, 604b and data 606, 606a, 606b are each organized into self-contained function blocks 610, 610a, 610b within the datagram 250. The function blocks 610, 610a, 610b might all contain operations that each relate to the same functionality in the robotic vehicle 100, e.g., actuator data or sensor data. Placing multiple operations 602, 602a, 602b within a single datagram 250 requires less overhead (e.g. fewer control frames 500) to be transmitted on the network 200 relative to the number of commands to be carried out by components or resources 110 of the robotic vehicle 100. This ensures a relatively high ratio of data payload to headers in a datagram. Each function block 610, 610a, 610b is a minimum of four bytes.

Figure 7:
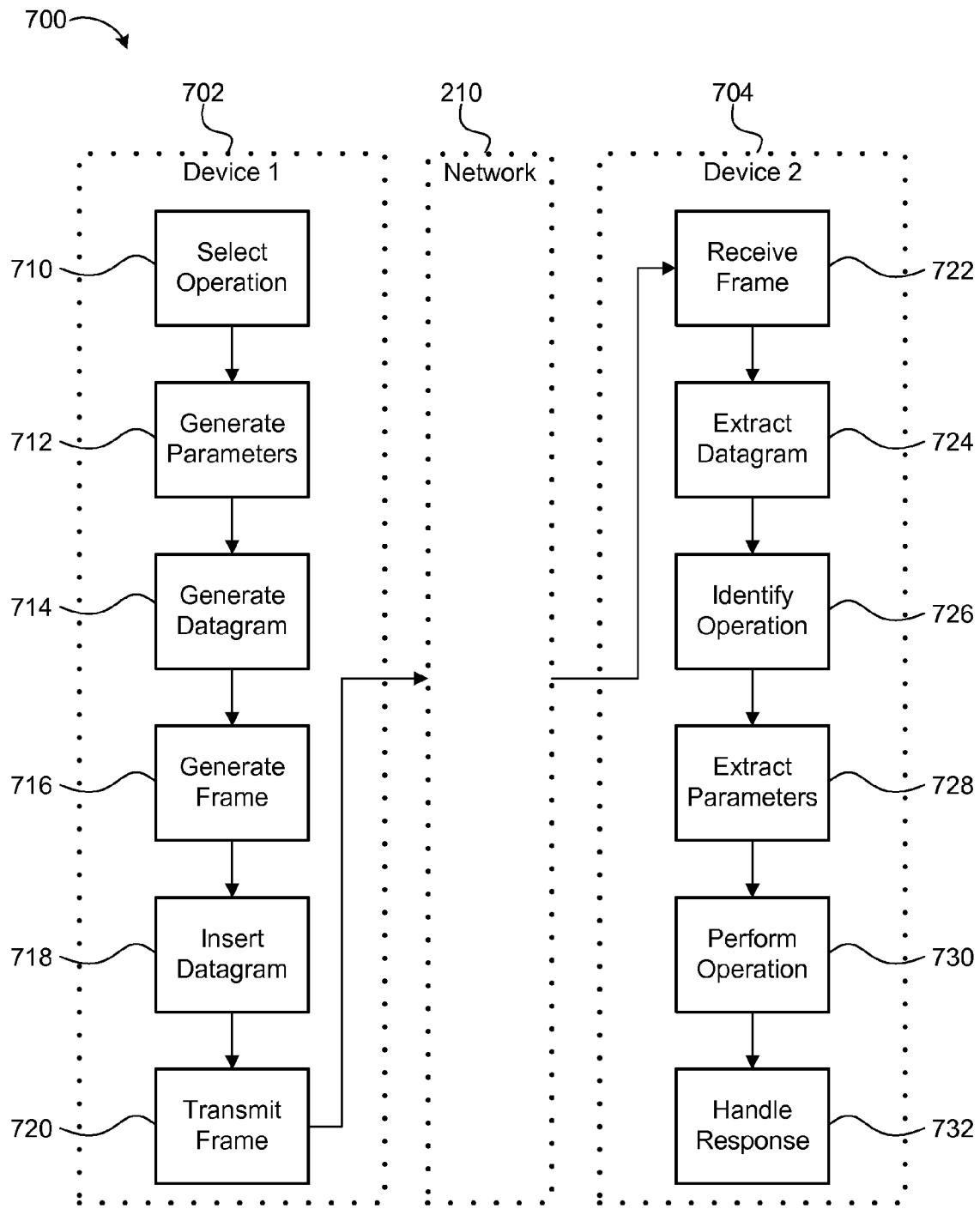
FIG. 7 is a flowchart of a resource access protocol.

Referring to FIG. 7, a flow chart 700 represents an arrangement of communication operations or actions between a first device 702 and a second device 704 according to the resource access protocol 205. The first device 702 could be, for example, a robot controller 220, and the second device 704 could be, for example, a resource node 230. Typically, the communication operations are executed on the first and second device 702, 704. Communication operations of the first device 702 include selecting 710 a device operation, generating 712 parameters for the device operation, and generating 714 a datagram 250 containing the device operation 602, parameters 604, and data 606. The first device can optionally select 710 an additional device operation and generate 712 parameters for the device operation to be included in the same datagram 250, repeating these steps for each additional device operation. Communication operations of the first device 702 further include generating 716 a MAC control frame 500 specifying the second device 704 as its destination, inserting 718 the datagram 250 into the MAC control frame 500 and transmitting 720 the control frame 500 to the network 210.

Communication operations of the second device 704 include receiving 722 the control frame 500 from the network 210, extracting 724 the datagram 250 from the frame 500, and identifying 726 the device operation in the datagram 250. Communication operations of the second device 704 further include extracting 728 the parameters for the device operation and performing 730 the device operation according to the parameters. In some implementations, the communication operations of the second device 704 include handling 732 an optional response to the first device 702, which would constitute a repeat of communication operations 710 through 730 using the appropriate device operation. For example, if the first device operation was a "read" operation, the second device 704 would generate a "read reply" device operation and send it to the first device 702. If the datagram 250 includes additional device operations 602, the second device can identify 726 a device operation, extract 728 the parameters associated with the device operation, perform the device operation, and handle 732 an optional response, repeating these operations for each additional device operation.

Figure 8A:
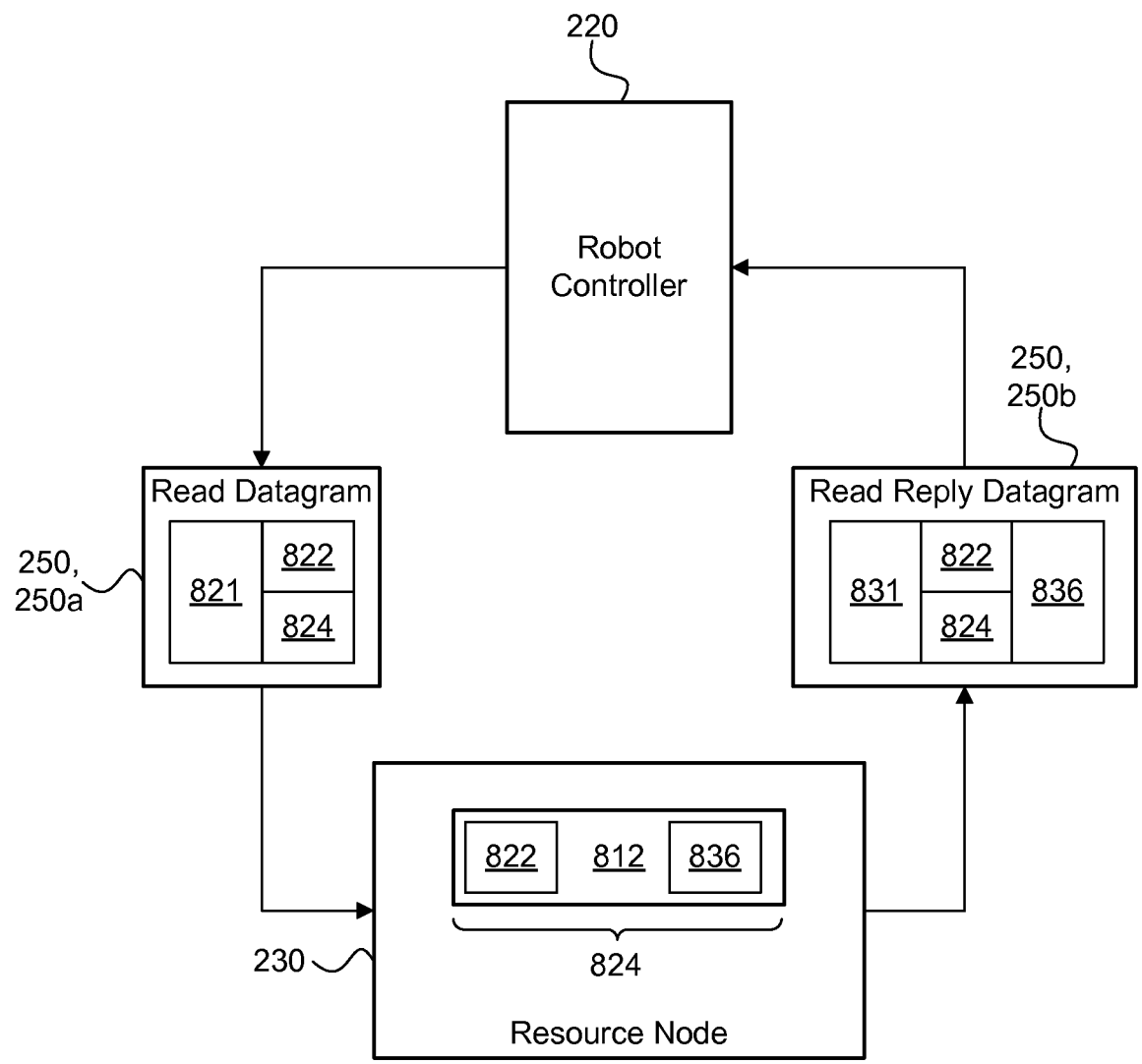
FIG. 8A is a schematic view of an exemplary resource access protocol read command.
Figure 8B:
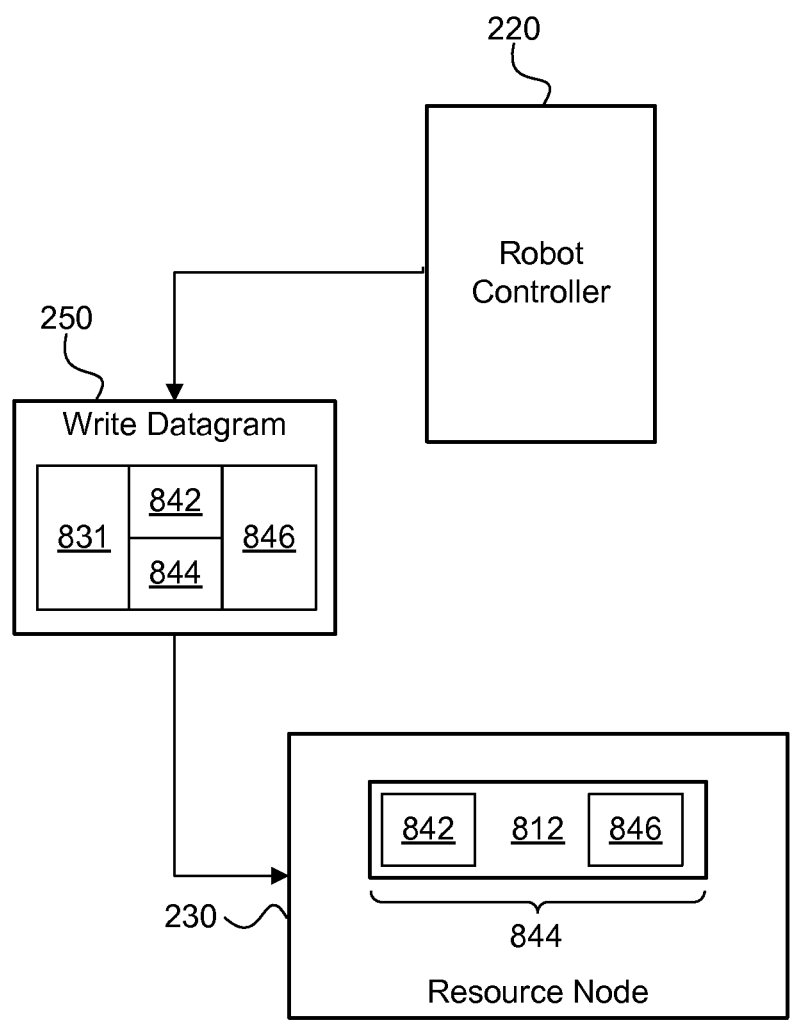
FIG. 8B is a schematic view of an exemplary resource access protocol write command.

FIGS. 8A and 8B illustrate how the memory [#] of resource nodes 230 is visible to and directly accessible by the robot controller 220. FIG. 8A illustrates example actions related to a read operation. A robot controller 220 transmits a datagram 250, 250a containing the read operation 821 and parameters for the address 822 and length 824 of the data requested. When the datagram 250 arrives at the resource node 230, the resource node 230 identifies the applicable memory registers 812 according to the address 822 and length 824, which in this example is the length of the data 836 in a single register 812 at the address 822. The resource node 230 generates a datagram 250, 250b containing a read reply action 831, the address 822 from which the data came from, the length 824 of the data, and the data 836 itself from the register 812.

FIG. 8B illustrates example actions of the write operation. The robot controller 220 transmits a datagram 250 containing the write operation 841 and parameters for the destination address 842, data length 844, and data 846. When the datagram 250 arrives at the resource node 230, the resource node 230 identifies the applicable memory registers according to the address 842 and length 844, which in this example is the length of the data in a single register 812. The resource node 230 writes the data 846 as the data of the register 812.

The robotic vehicle 100 may have components that interfere with the operation of electronic devices connected to the I/O system 200. These components may include the drive motors 36, 46 and associated motor amplifiers, batteries, and other electromechanical devices that typically make up robotic systems. These components tend to produce electrical interference that will disrupt communications over the network 210. The I/O system 200 is capable of ensuring that any disruptions in communications among the robot components and payloads are compensated for and minimized. The resource access protocol 205 may allow or indicate repetition of data sent over the network 210.

Figure 9:
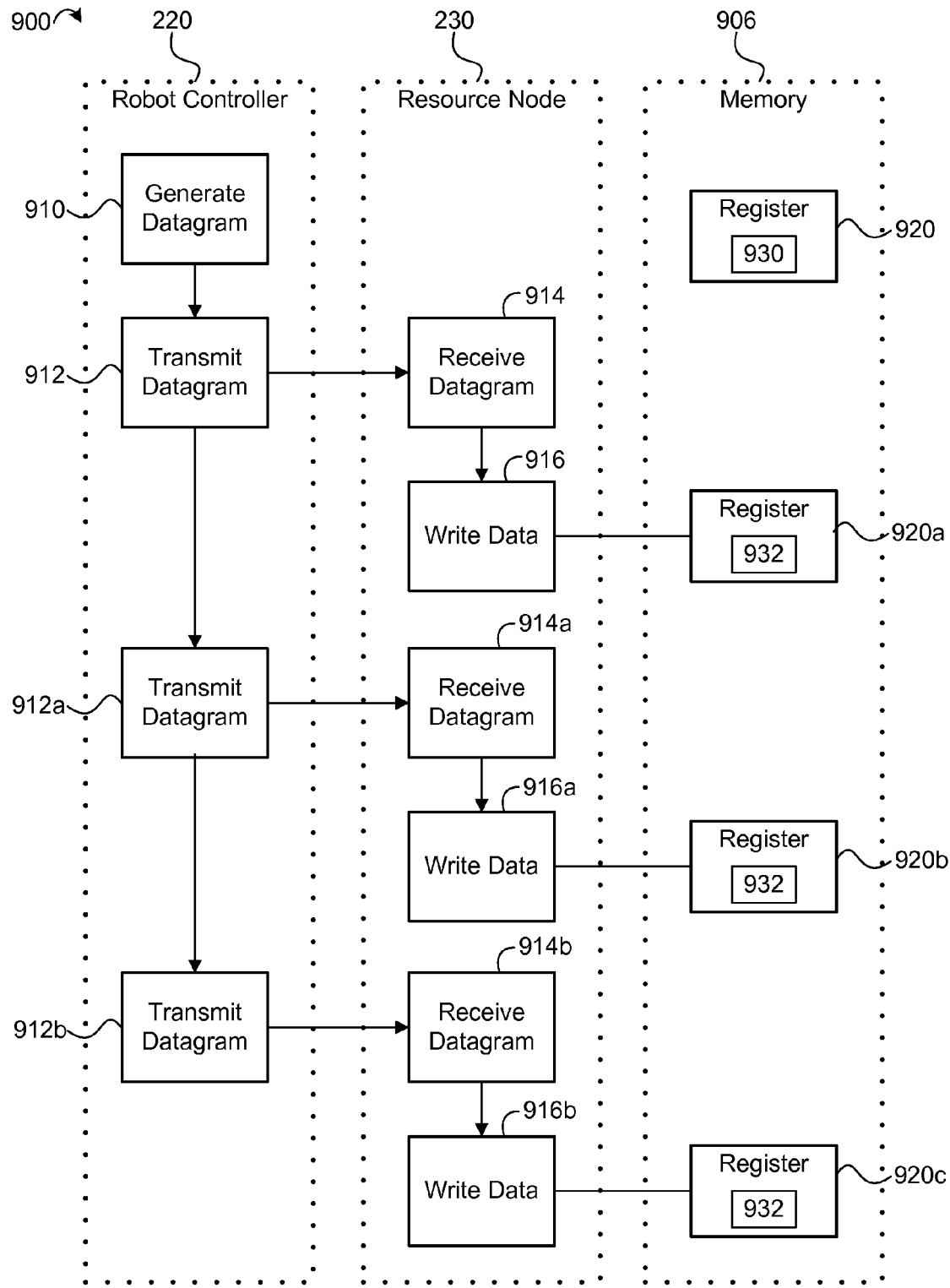
FIG. 9 is a flowchart providing an exemplary arrangement of operations of a resource access protocol.

Referring to FIG. 9, in some implementations, the resource access protocol 205 allows for redundant transmission of datagrams 250 with no adverse effect. The flow chart 900 represents an example arrangement of communication operations between a robot controller 220, a resource node 230, and the instant state of a memory 906 belonging to the resource node 230 (for example, the memory of a robot resource 110). A register 920, 920a, 920b, 920c of the memory 906 is shown at multiple points in the exemplary process.

Communication operations of the robot controller 220 include generating 910 a datagram 250 containing a "write" operation, the address of the destination register 920, and the data to be written, and transmitting 912 the datagram 250 over the network 210 to the resource node 230. Communication operations of the resource node 230 include receiving 914 the datagram 250. Further operations of the resource node 230 include writing 916 the data 932 to the register 920, replacing the old data 930. Accordingly, the updated register 920a contains data 932 after the "write" operation.

The robot controller 220 can transmit 912, 912a, 912b an identical datagram 250 multiple times. The resource node will receive 914, 914a, 914b the datagram 250 and write 916a, 916b the same data each time. After the second transmission 912a of the datagram 250, the updated register 920b still contains the same data 932 as it did after the receipt of only the first transmission 912. Similarly, after the third transmission 912b of the same datagram 250, the updated register 920b still has the same data 932 as its contents.

Because, in this example, the robot controller 220 interacts with the resource node 230 by providing operations related to reading and writing memory directly, a datagram 250 can be re-transmitted many times and the duplicate datagrams 250 can be received in any order without affecting the integrity or the validity of the data 932 written to the register 920.

The resource access protocol 205 may allow multiple redundant datagrams 250 for reliability of communications over the network 210. The data 932 is properly written and updated if at least one of the datagrams 250 is received 914, 914a, 914b. Some of the datagrams 250 may not be properly transmitted 912, 912a, 912b if the operating conditions of the I/O system 200 are poor, for example, if the I/O system 200 is operating in an extreme temperature, or an unusual atmosphere, or another condition that affects the operation of electronics. The system will perform the operation specified by multiple redundant datagrams 250 even if a subset of the datagrams 250 are lost in transmission.

Figure 10A:
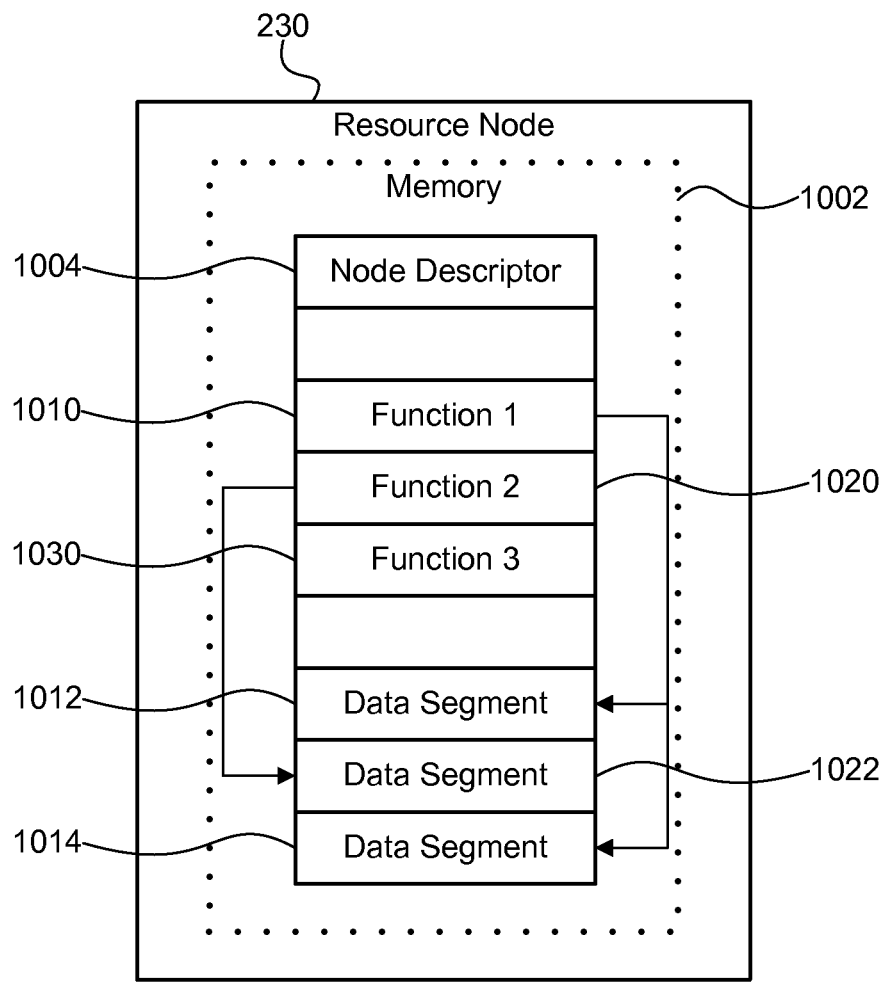
FIGS. 10A-10B are schematic views of exemplary resource nodes.

Referring to FIG. 10A, in some implementations, the resource node 230 has a memory 1002 containing data related to functions 1010, 1020, 1030, where the functions are configurable and are logical representations of the robot resources 110 that the resource node 230 makes available to the network 210. For example, if one of the connected robot resources 110 is a temperature sensor for a power source 29, such as a battery unit (FIG. 1A) of the robotic vehicle 100, the related function may include monitor the battery temperature. The memory 1002 is a buffer fully visible to the robot controller 220 at all times so that the buffer can be accessed over and over as many times as necessary. By comparison, in other examples, the memory 1002 might be implemented as a queue that the robot controller 220 places commands into, and the robot resource 110 reads and removes commands from. In these examples, if the robot controller 220 sends duplicate commands for the purpose of redundancy, the robot resource 110 might have to expend processing time identifying the duplicate commands, or the robot resource 110 might erroneously execute two or more of the same command when only one execution was intended.

With regard to the implementation shown in FIG. 10A, if a component such as a drive motor 36, 46 generates noise or interference that blocks a read or write of the memory 1002, the robot controller 220 can simply issue a duplicate command to read or write the memory 1002 a second time. If the robot resource 110 does receive and execute two or more of the duplicate commands, the same data is read from or written to the memory 1002 each time without any change in the operational result. No matter how many executions take place, one and only one instance of the command to read or write the memory is achieved. The robot resource 110 thus performs a single action in response to the command.

In some examples, the memory 1002 is a linear memory that is sub-divided into data words of equal size. The memory 1002 can include a node descriptor 1004 containing information on how the memory 1002 is delimited, as well as identification information about this particular resource node 230, including, for example, the address of the resource node 230 on the network 210, and the physical configuration of the resource node 230 (e.g. a configuration corresponding to the layouts discussed above with respect to FIGS. 3A-3C). The node descriptor 1004 can also include information on the hardware version, configured hardware options, firmware type, firmware version, and development status. The node descriptor 1004 may have indicators configured to identify the robot controller(s) 220 with which the resource node 230 communicates.

In some examples, there are three functions 1010, 1020, 1030. Each function 1010, 1020, 1030 can have at least one corresponding data segment 1012, 1014, 1022. In this example, the resource node 230 has one function 1010 assigned to two non-contiguous data segments 1012, 1014, one function 1020 assigned to one data segment 1022, and one function 1030 assigned to no data segments.

Figure 10B:
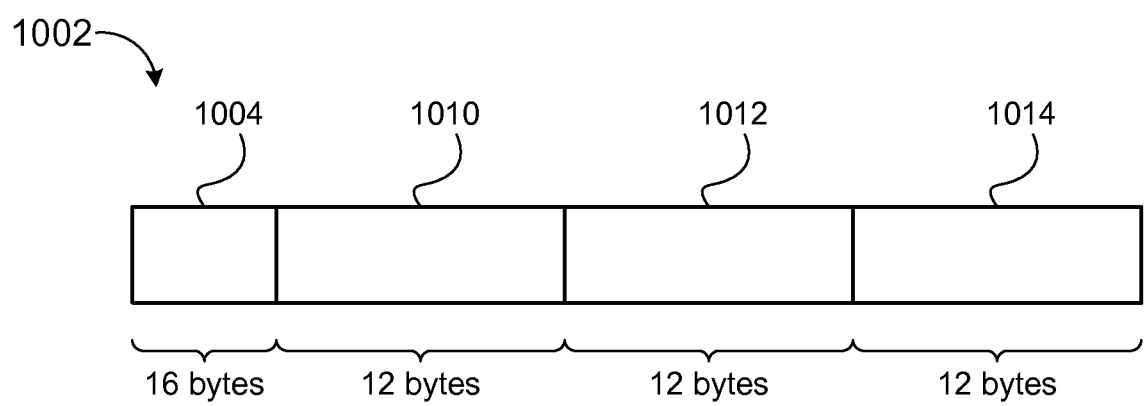

FIG. 10B provides a schematic of a portion of the memory 1002 at the resource node 230. In the example shown, the node descriptor 1004 is 16 bytes in length, while one function is 12 bytes in length and its two data segments 1012, 1014 are both also 12 bytes in length.

Figure 11:
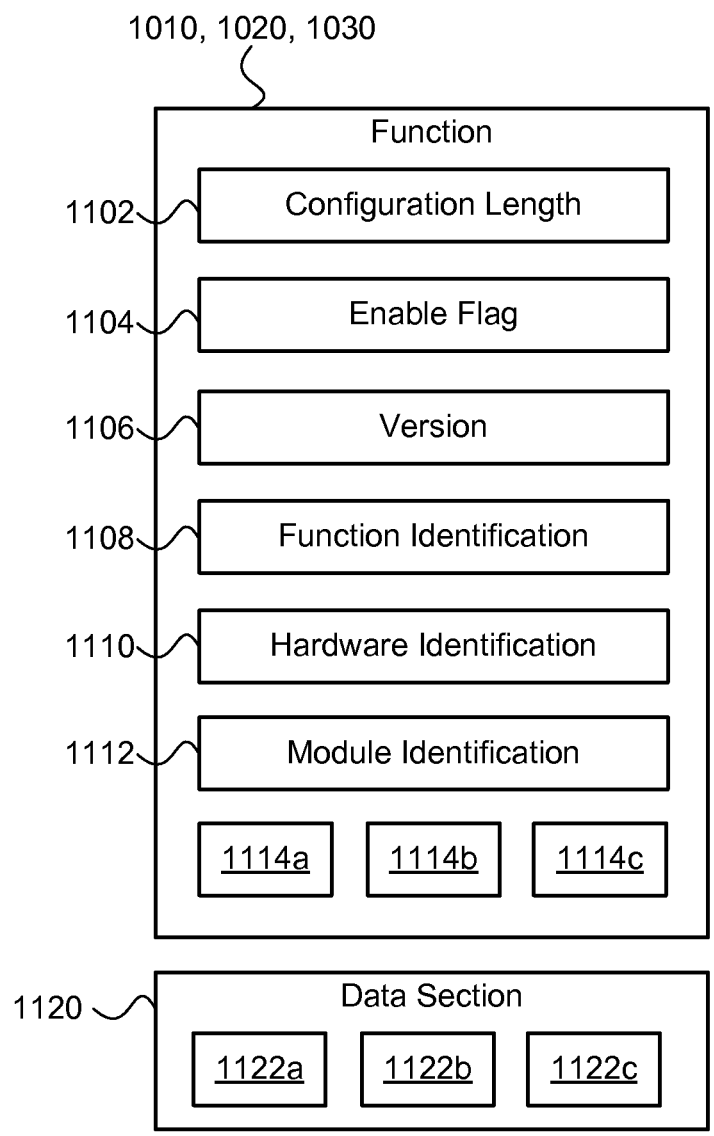
FIG. 11 is a schematic view of an exemplary resource node function.

Referring to FIG. 11, in some implementations, each function 1010, 1020, 1030 has configurable registers. Some examples of configurable registers are as follows. The configuration length 1102 indicates the number of configurable registers associated with this particular function 1010, 1020, 1030. The enable flag 1104 can be set to enable or disable this function 1010, 1020, 1030. The version 1106 indicates which version or revision of the function 1010, 1020, 1030 is represented. The function identification 1108 indicates the particular type of this function 1010, 1020, 1030. The hardware identification 1110 indicates the particular hardware resource (e.g., a particular payload 90) accessible by this function 1010, 1020, 1030. The module identification 1112 indicates the program code used to carry out this function 1010, 1020, 1030, and can also include the version and development status of the program code. The function 1010, 1020, 1030 may have additional function-specific registers 1114a, 1114b, 1114c, which can be custom-tailored for the function type defined by the function identification 1108.

In some implementations, a given resource node 230 can have multiple instances of a function 1010, 1020, 1030, each having the same value for the function identification 1108. However, different instances of the same function 1010, 1020, 1030 will have different values for the hardware identification 1110, each hardware identification value corresponding to a different hardware resource, such as a pin on a local controller, or a physical interface port, or some other kind of resource. Further, if the hardware resource associated with one instance of a function 1010, 1020, 1030 operates differently than the hardware resource associated with a different instance of the function 1010, 1020, 1030, then each instance of the function 1010, 1020, 1030 can have a different module identification 1112 indicating what program code can be used to properly utilize the hardware resource.

In some implementations, the function 1010, 1020, 1030 may have an optional data section 1120, containing one or more data registers 1122a, 1122b, 1122c. The data registers 1122a, 1122b, 1122c can be spread among multiple data segments 1012, 1014, 1022, but are grouped together as one logical data section 1120. The data registers 1122a, 1122b, 1122c contain data to be operated on by the function 1010, 1020, 1030. For example, if the function 1010, 1020, 1030 represents an interface on a resource node 230, one or more data registers 1122a, 1122b, 1122c could store the data transferred to or from an external device linked to the interface.

Figure 12:
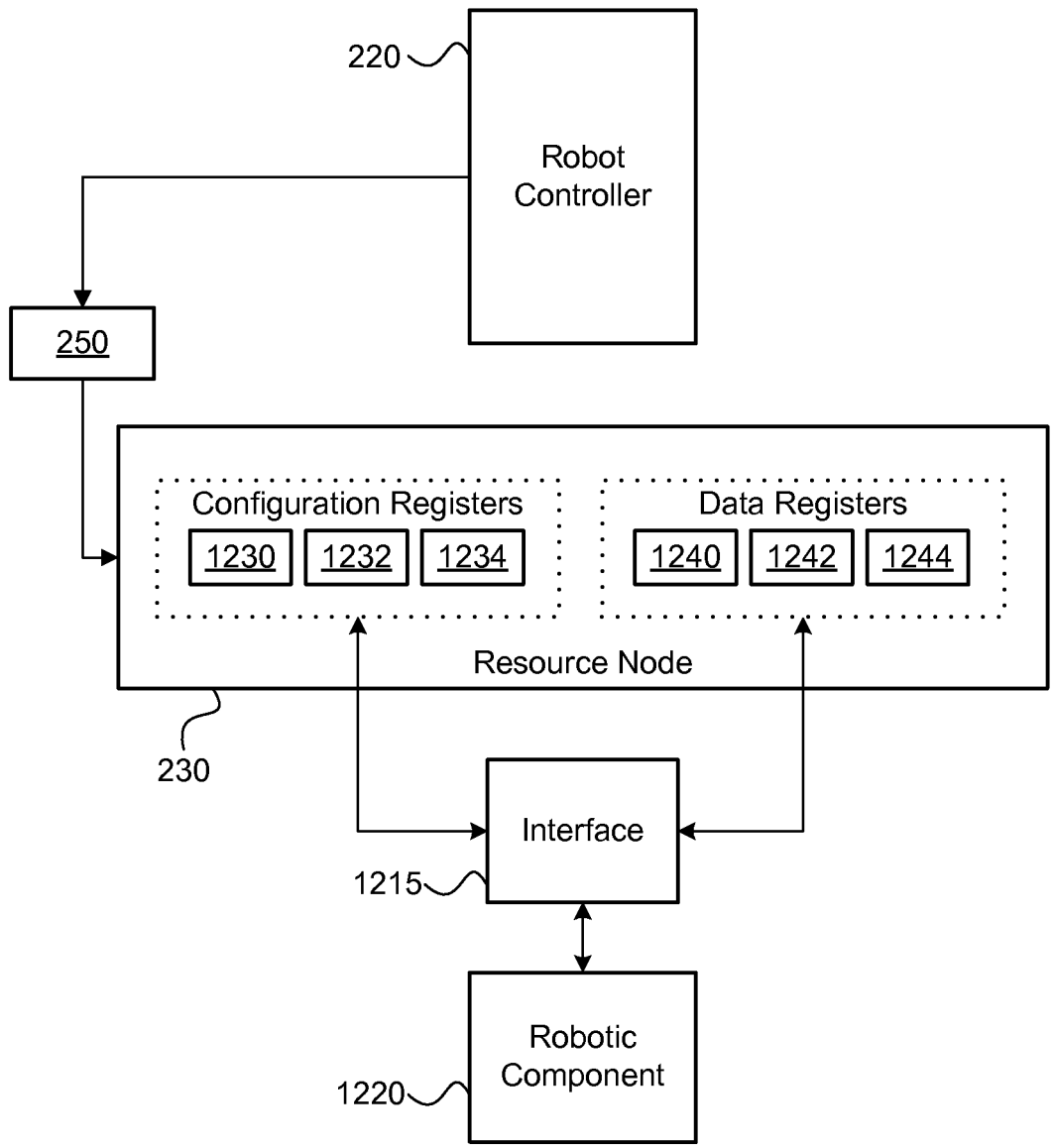
FIG. 12 is a schematic view of an exemplary robot controller communicating with a resource node.

FIG. 12 illustrates example operations related to a how the robot controller 220 can use the resource access protocol 205 to manipulate the resources linked to a resource node 230. In this example, the robot controller 220 communicates with a resource node 230, which is linked by an interface 1215 to a robotic component 1220.

The robot controller 220 sends a datagram 250 to the resource node 230, where the datagram 250 can contain, for example, a "Write" operation. The robot controller 220 is configured to recognize which registers in the resource node correspond to function configuration registers 1230, 1232, 1234, and which registers correspond to data registers 1240, 1242, 1244. Further, the robot controller 220 is also configured to recognize which function or functions correspond to the interface 1215. For example, to access the robotic component 1220, the robot controller 220 can send a "Write" operation datagram 250 altering the configuration registers 1230, 1232, 1234, causing data to be read from or written to the interface 1215, and thus the robotic component 1220. In another example, the robot controller 220 can send a "Write" operation datagram 250 altering the data registers 1240, 1242, 1244 to reflect data that will be transferred to the robotic component over the interface. In another example, the robot controller 220 can send a "Read" operation datagram 250 requesting the contents of any of the data registers 1240, 1242, 1244 if one or more of the registers has been altered to reflect data that the robotic component 1220 has transmitted over the interface 1215.

The robot controller 220 has access to the robotic component 1220 over the interface 1215, by way of the resource node 230 and the network 210. The resource access protocol 205 allows direct manipulation of the robotic component 1220 over the network 210 with a minimum of intermediate processing of the robot controller's commands. Further, this method of operation is not limited to the interaction between a robot controller 220 and a resource node 230. For example, one resource node 230 could send datagrams 250 containing operations to another resource node 230. Other devices besides robot controllers 220 and resource nodes 230 could also use the resource access protocol 205.

Figure 13:
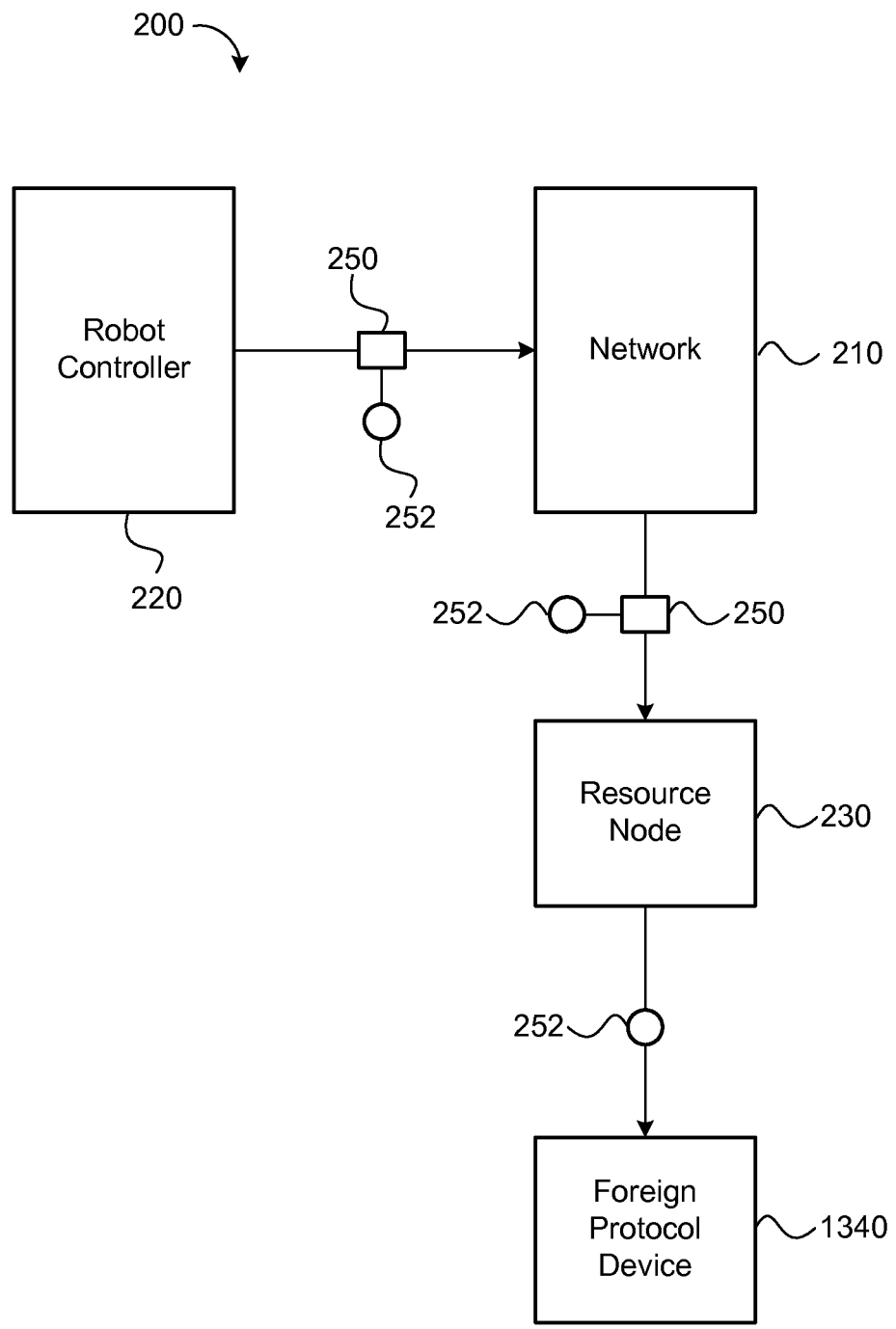
FIG. 13 is a schematic view of an exemplary input/output system.

Referring to FIG. 13, in some implementations, the resource access protocol 205 can be used to transport data units 252 used by other protocols. In some implementations, the I/O system 200 includes a network 210, a robot controller 220, a resource node 230, and a foreign protocol device 1340. The foreign protocol device 1340 communicates with the network 210 through the resource node 230, and in the configuration shown, acts as a resource made available by the resource node 230. The robot controller 220 can send a resource access protocol 205 datagram 250 that contains another data unit 252 formatted according to the foreign protocol. The data unit 252 could be generated by the robot controller 220, for example, or it could arrive from another foreign protocol device 1340 on the network 210, or from another source. The foreign protocol could be, for example, a protocol associated with a serial management interface (SMI), a protocol associated with a controller-area network (CAN), a custom-tailored protocol used by a particular device or category of devices such as a robotic component or payload 90, or another protocol.

In the example shown, the datagram 250 containing the foreign protocol data unit 252 is transmitted to the Ethernet network in a form supported by the network 210, for example, a control frame 500 as described above with respect to FIG. 5C. The datagram 250 is propagated to the resource node 230, which processes the datagram 230 and transmits the data unit 252 contained within to the foreign protocol device 1340. In this way, the foreign protocol data unit 252 has been "tunneled" across the devices operating according to the resource access protocol 205. In some examples, the data unit 252 can be a data construct 260 defined by a protocol operating on a different layer of communication than the datagram 250, as described earlier with respect to FIG. 5B.

Figure 14:
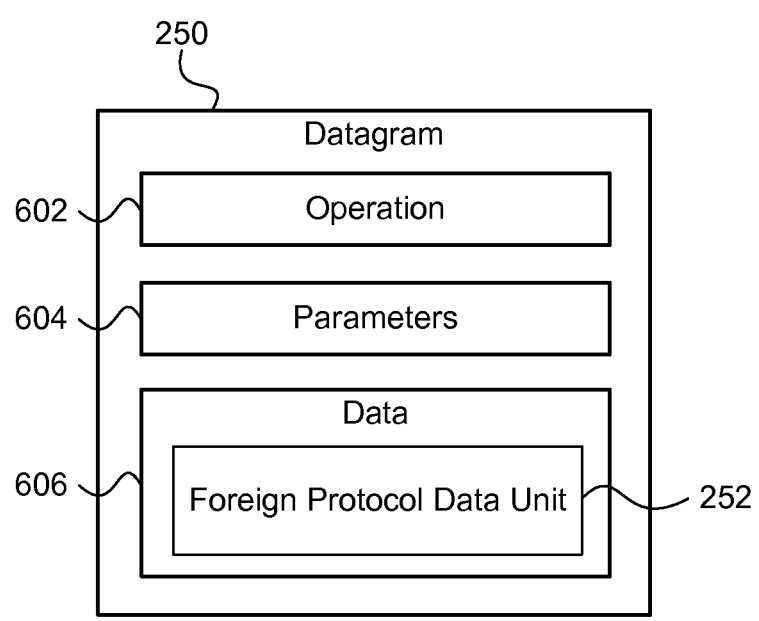
FIG. 14 is a schematic view of an exemplary resource access protocol datagram.

Referring to FIG. 14, a resource access protocol 205 datagram 250 has an operation 602, parameters 604, and data 606. In some implementations, the datagram 250 is capable of carrying a data unit 252 defined according to a foreign protocol within the data section 606. The operation 602 and parameters 604 of the datagram 250 relate to carrying the data unit 252 across resource access protocol 205 devices in the manner described above. For example, if the datagram 250 is carrying a data unit 252 from a robot controller 220 to a resource node 230, the operation 602 could be "Write." Recall from the description above with respect to FIG. 12 that a resource node 230 contains function configuration registers 1230, 1232, 1234 and data registers 1240, 1242, 1244. In some examples, the parameters 604 could specify the address of registers corresponding to a function configured to transmit data from the resource node 230 to a foreign protocol device 1340. Because the data section 606 of the datagram 250 contains the foreign protocol data unit 252, the resource node 230 processing the datagram 250 writes the data section 606, including the data unit 252, to the appropriate data register 1240, 1242, 1244, causing the data unit 252 to be transmitted to the foreign protocol device 1340. Other configurations of the datagram 250 can handle other operations 602 required to carry a foreign protocol data unit 252. For example, a datagram 250 carrying a "Read Reply" operation 602 could also contain a foreign protocol data unit 252 read from a resource node 230. Other configurations are possible.

A network 210 with devices operating according to the resource access protocol 205 may have many robot controllers 220, resource nodes 230, and other devices. The robot controller 220 can communicate with network devices if the robot controller 220 is aware of those devices and the current address of each device on the network 210. Accordingly, a robot controller 220 can determine which devices, including resource nodes 230, are available on the network 210, as well as how each device is linked to the network 210. In this way, each robot controller 220 can generate an internal "map" of the network 210 and associated devices.

Figure 15A:
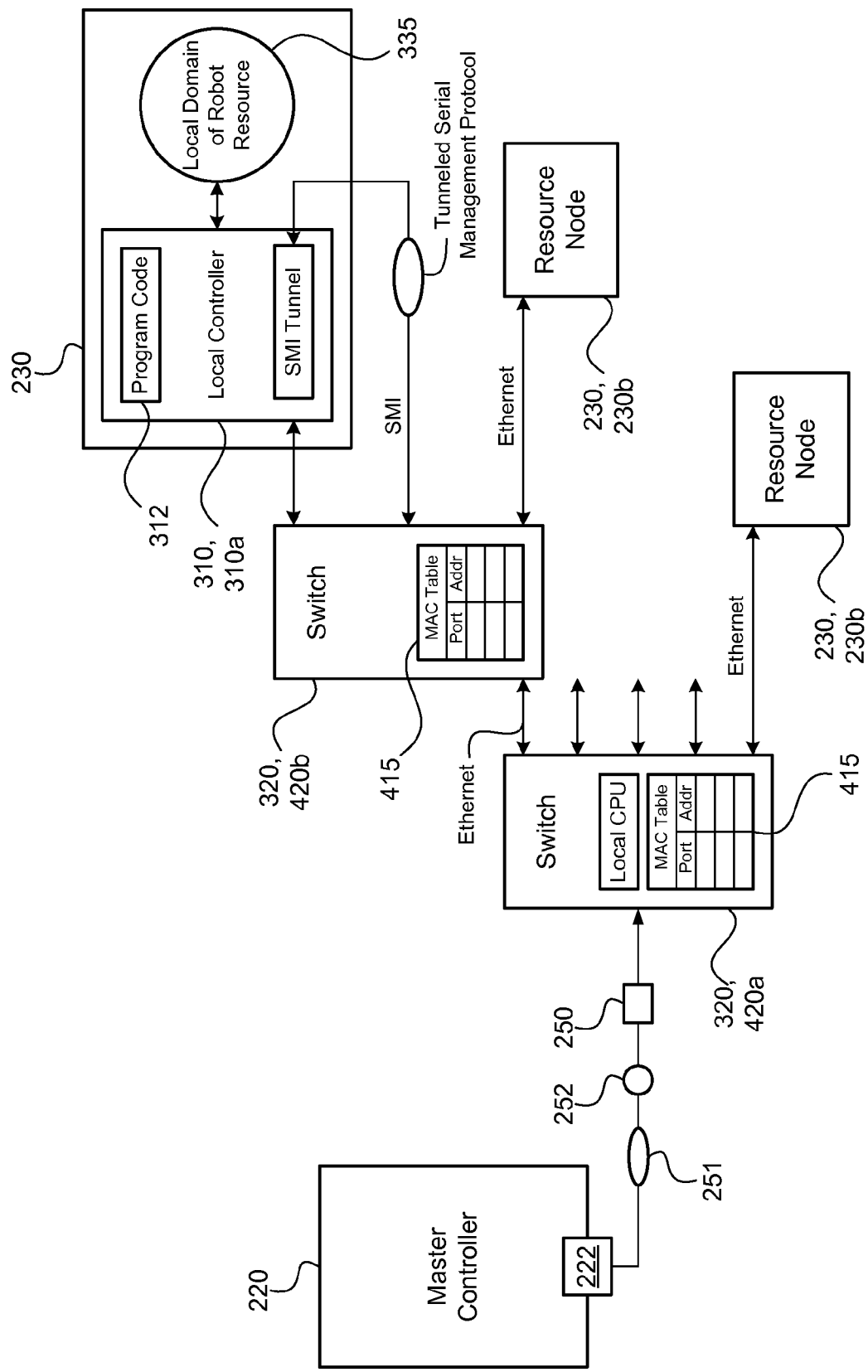
FIG. 15A is a schematic view of an exemplary I/O system.

Referring to FIG. 15A, Ethernet switches 320, 420, 420a, 420b each keep a history of the source and destination MAC address 314, 414 of every packet 251 that passes through the Ethernet switches 320, as well as the physical port 440 on which the MAC address 314, 414 came from. The Ethernet switches 320, 420, 420a, 420b can route the data packet 251 to appropriate ports 440 to segregate traffic and increase throughput. The data packet 251, which holds the correlation of devices to physical ports 440 is made available outside of the switch 320, 420, 420a, 420b. On power up, a broadcast packet 251 can be sent to all connected devices forcing them to respond, and allowing the network switch 320, 420 to learn the location of each device. Once each switch 320, 420, 420a, 420b has memorized the MAC address 314, 414 of every connected device, MAC address tables 415 are communicated to the Host/Master-Controller 220 for processing. The data may be accessed in a couple of ways.

In some examples, an Ethernet switches 420a includes an embedded processor for processing simple commands and allowing access to management features. FIG. 15A illustrates an example of a switch 420a that can communicate the MAC Address table 415 directly over the Ethernet network 210 without any custom hardware. In other examples, an Ethernet switches 420b does not include an embedded processor or controller, and the MAC address table 415 can only be accessed through a Serial Management Interface (SMI). A custom controller, such as an I/O Resource Node 230, can be used to gain access to the MAC address table 415. The SMI protocol can be tunneled through an I/O resource node 230 as previously discussed.

Once the master controller 220 has the data from every switch 420, 420a, 420b, it can find the "root" switch 420, 420a, 420b by seeing which switch 420, 420a, 420b has every single resource-node address in memory. Then the master controller 220 chooses one of the ports 440 on that Ethernet switch 420, 420a, 420b, locates the next switch 420, 420a, 420b that has the most MAC addresses 414 in memory and sets that switch 420, 420a, 420b as the root-switch of that port 440. This process can be recursively repeated until every device address 414 is located on every port 440a, 440b, 440c, 440d, 440e of every switch 420, 420a, 420b. By knowing how the devices or robot resources are interconnected, hardware-specific descriptors of every resource 230 node can be read to identify it further by referencing port numbers with a database of known robot ports. For instance, while using one "tree" of network switches 420, 420a, 420b, a root-switch 420, 420a, 420b can be found for a turret, for example, to be mounted inside a payload 90. The next physical device in the tree is a single link of a manipulator arm, and then another link of an arm just like it. At the top of the arm is a device with a gripper. The interconnection of resource nodes 230 provides a map of the electrical and physical arrangement of devices or robot resources. By knowing the physical configuration of the robotic vehicle 100, the master controller 220 can calculate the overall center of gravity (CG) of the robotic vehicle 100, as well as the centers of gravity of various sub-systems, such as the chassis 20, drive system, linkage 70, deck assembly 80, and/or functional payload 90 to control the robotic vehicle 100 in a stable manner, for example, to climb stairs, assume a pose, and not fall over. The robot vehicle 100 can also perform self-collision avoidance while allowing a user to modify the physical interconnect of the robotic vehicle 100 in the field.

Figure 15B:
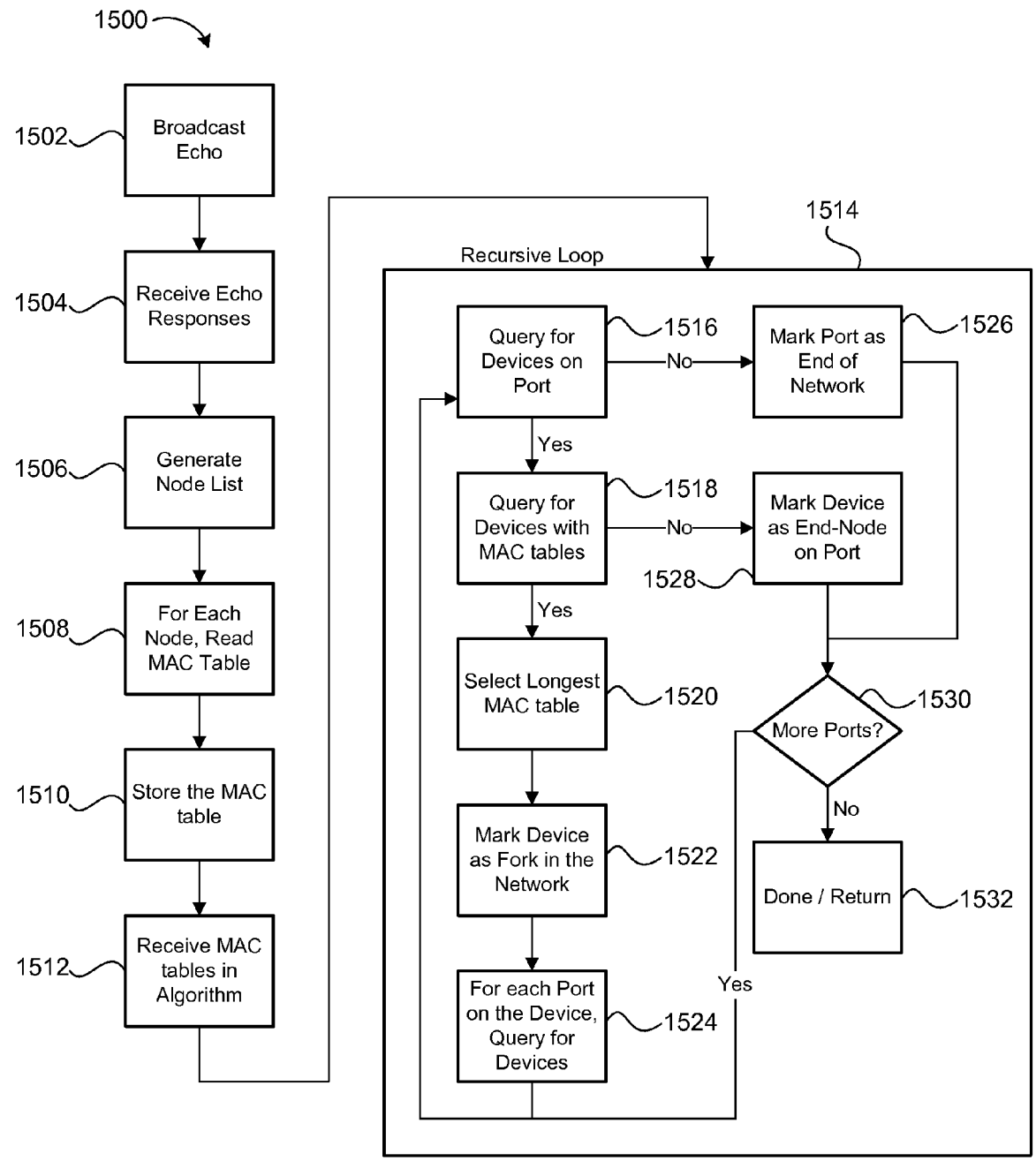
FIG. 15B is a flowchart providing an exemplary arrangement of operations of network topology discovery.

FIG. 15B provides a flow chart 1500 representing an arrangement of operations related to generating a map of the network 210. Operations of the robot controller 220 include sending 1502 a broadcast echo-request to all I/O resource nodes 230 of the I/O system 200 (e.g., querying all of the I/O resource nodes 230). Operations of the robot controller 220 include receiving 1504 an echo response from every I/O resource node 230. All network switches 320, 420 memorize the MAC Address 314, 414 of every associated I/O resource node 230 or device in the I/O system 200. Operations of the robot controller 220, as the host, include generating 1506 an I/O resource node list and storing the list of all of the I/O resource nodes 230 or devices in a database. Operations include, for each I/O resource nodes 230 in the I/O resource node list, reading 1508 a MAC table of the I/O resource node 230 (if available) (e.g., by querying the I/O resource node 230 for the MAC table information and receiving a response with the MAC table). Operations further include storing 1510 each MAC table in the database. Operations include receiving 1512 the MAC tables (e.g., from the database) in a state algorithm having a recursive loop 1514. The host is the root device or root I/O resource node 230, which has one port, so every single MAC Address 314, 414 is used in the algorithm. The algorithm uses a recursive loop 1514 such that a subset of the MAC Addresses 314, 414 is used by the algorithm until an end-node 230 is found on every port 440 of every switch 420. For each network switch port 440, operations include querying 1516 for any devices or I/O resource nodes 230 on that port 440. If the port 440 has devices or I/O resource nodes 230, then query 1518 for devices or I/O resource nodes 230 with MAC tables. If the port has any devices or I/O resource nodes 230 having MAC tables, then select 1520 the longest MAC table. Operations include marking 1522 the device or I/O resource node 230 having the longest MAC table as a fork in the network 210. Operations include recursively querying 1516 for devices on every port 440 of the device or I/O resource node 230 and looping through until an end-node is found on every port 440 of every switch 420. After querying 1516 for devices on every port 440 of the device or I/O resource node 230, if the port 440 has no devices, then mark 1526 the port 440 as an end of the network 210. If the port 440 has devices or I/O resource nodes 230, then query 1518 for devices or I/O resource nodes 230 with MAC tables. If any device or I/O resource node 230 does not have a MAC table, then mark 1528 that device or I/O resource node 230 as an end-node on that port 440. After marking 1526 a port 440 as an end of the network 210 or marking 1528 a device or I/O resource node 230 as an end-node on a port 440, operations include determining 1530 if any additional ports 440 exist on the device or I/O resource node 230, and if so, recursively querying 1516 for devices on every port 440 of the device or I/O resource node 230 and looping through until an end-node is found on every port 440 of every switch 420. If there are no additional ports 440, then return 1532 from the recursive loop 1514.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations or actions are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations of the invention have been described. Nevertheless, it will be understood that various modifications may be made without departing from the spirit and scope of the invention. For example, a resource node could have configurable power levels. As another example, network devices having internal clocks could be synchronized according to a synchronization protocol, e.g., the IEEE 1588 protocol. Accordingly, other implementations are within the scope of the following claims.

What is claimed is:

1. A mobile robot internal communication system comprising:
   a controller disposed on a mobile robot having one or more electronically controllable robot components in communication with the controller, each robot component having a memory directly accessible by the controller and corresponding to at least one robot function;
   wherein the controller is configured to issue memory access commands to the robot components, each memory access command being contained in a datagram having a single robot component address and a robot component operation corresponding to a state of the corresponding memory of the robot component, a first memory access command specifying robot component operation state information for a first robot component memory; and
   wherein the controller operates according to a media access control protocol supporting virtual local area network tagging.

2. The mobile robot internal communication system of claim 1, wherein the controller is configured to issue a second memory access command to read robot component operation state information from a second robot component memory.

3. The mobile robot internal communication system of claim 1, wherein the first robot component memory represents at least one of: a configuration of a portion of the robot component, and data associated with a portion of the robot component.

4. The mobile robot internal communication system of claim 1, wherein the controller issues memory access commands asynchronously with respect to other communication requests.

5. The mobile robot internal communication system of claim 1, wherein the controller is configured to issue a datagram that contains two or more memory access commands.

6. The mobile robot internal communication system of claim 1, wherein the controller is configured to generate a map of robot components in communication with the controller.

7. A method of communicating with components of a mobile robot, the method comprising:
   at a controller disposed on a mobile robot having at least one electronically controllable robot component in communication with the controller,
   issuing a memory access command to the robot component having a memory directly accessible by the controller and corresponding to at least one robot function, the memory access command contained in a datagram having a single robot component address and a robot component operation corresponding to a state of the corresponding memory of the robot component, wherein the memory access command specifies robot component operation state information for the robot component memory; and
   wherein the controller operates according to a media access control protocol supporting virtual local area network tagging.

8. The method of claim 7, further comprising reading robot component operation state information from the robot component memory, including issuing a second memory access command to the robot component.

9. The method of claim 7, wherein the memory represents at least one of: a configuration of a portion of the robot component, and data associated with a portion of the robot component.

10. The method of claim 7, wherein the controller issues memory access commands asynchronously with respect to other communication requests.

11. The method of claim 7, wherein the datagram contains a second memory access command.

12. The method of claim 7, further comprising generating a map of robot components in communication with the controller.

13. A method of communicating with components of a mobile robot, the method comprising:
- at a controller disposed on a mobile robot having one or more electronically controllable robot components in communication with the controller,
- issuing two identical datagrams to one of the robot components having a memory directly accessible by the controller and corresponding to at least one robot function, each datagram having a single robot component address and a robot component operation corresponding to a state of the corresponding memory of the robot component, and each datagram having one or more memory access commands, and each memory access command specifying robot component operation state information for the robot component memory;
- wherein the controller operates according to a media access control protocol supporting virtual local area network tagging.

* * * * *